United States Patent
Kosuge

(10) Patent No.: US 11,169,405 B2
(45) Date of Patent: Nov. 9, 2021

(54) DISPLAY DEVICE COMPRISING A FIRST DISPLAY ELECTRODE, A FIRST ELECTRODE, AND AN INSULATING FILM INCLUDING AN INORGANIC INSULATING FILM AND AN ORGANIC INSULATING FILM

(71) Applicant: Japan Display Inc., Minato-ku (JP)

(72) Inventor: Masahiro Kosuge, Tokyo (JP)

(73) Assignee: Japan Display Inc., Minato-ku (JP)

( * ) Notice: Subject to any disclaimer, the term of this patent is extended or adjusted under 35 U.S.C. 154(b) by 422 days.

(21) Appl. No.: 15/935,353

(22) Filed: Mar. 26, 2018

(65) Prior Publication Data

US 2018/0284527 A1 Oct. 4, 2018

(30) Foreign Application Priority Data

Mar. 29, 2017 (JP) .............................. JP2017-065324

(51) Int. Cl.
*G02F 1/1333* (2006.01)
*G02F 1/1335* (2006.01)
(Continued)

(52) U.S. Cl.
CPC ...... *G02F 1/133345* (2013.01); *G02F 1/1337* (2013.01); *G02F 1/1343* (2013.01); *G02F 1/1345* (2013.01); *G02F 1/13439* (2013.01); *G02F 1/13452* (2013.01); *G02F 1/13454* (2013.01); *G02F 1/133512* (2013.01);
(Continued)

(58) Field of Classification Search
CPC .......... G02F 2001/13456; G02F 2001/133776; G02F 2001/133388
See application file for complete search history.

(56) References Cited

U.S. PATENT DOCUMENTS

2015/0131041 A1\* 5/2015 Moriwaki ......... G02F 1/133345
349/106
2016/0091764 A1\* 3/2016 Asozu ............... G02F 1/134309
349/42
(Continued)

FOREIGN PATENT DOCUMENTS

CN 104166273 A \* 11/2014 ....... G02F 1/133784
CN 104238194 A \* 12/2014 ....... G02F 1/133753
(Continued)

*Primary Examiner* — Paul C Lee
(74) *Attorney, Agent, or Firm* — Oblon, McClelland, Maier & Neustadt, L.L.P.

(57) ABSTRACT

A display device includes a substrate having a display region and a peripheral region outside the display region; a liquid crystal layer; an insulating film between the liquid crystal layer and the substrate; an alignment film between the insulating film and the liquid crystal layer and having a front surface in contact with the liquid crystal layer; a pixel electrode having a front surface in contact with the alignment film in the display region; and an electrode having a front surface in contact with the alignment film in the peripheral region. Also, the electrode is supplied with an electric potential in the peripheral region. Each of the alignment film, the pixel electrode, and the electrode is formed on the insulating film. A distance from the substrate to the front surface of the electrode is longer than a distance from the substrate to the front surface of the pixel electrode.

14 Claims, 13 Drawing Sheets

(51) Int. Cl.
*G02F 1/1343* (2006.01)
*G02F 1/1337* (2006.01)
*G02F 1/1345* (2006.01)

(52) U.S. Cl.
CPC ...... *G02F 1/13456* (2021.01); *G02F 1/13458* (2013.01); *G02F 1/133388* (2021.01); *G02F 1/133776* (2021.01)

(56) References Cited

U.S. PATENT DOCUMENTS

| | | | | |
|---|---|---|---|---|
| 2016/0139470 A1* | 5/2016 | Sato | ............... | G02F 1/1337 349/123 |
| 2016/0161776 A1* | 6/2016 | Wang | ............... | G02F 1/1339 349/43 |
| 2016/0187706 A1* | 6/2016 | Onuma | ............... | G02F 1/1337 349/12 |

FOREIGN PATENT DOCUMENTS

| | | | | | |
|---|---|---|---|---|---|
| JP | 2000267598 A | * | 9/2000 | | |
| JP | 2014-201941 | | 10/2014 | | |
| JP | 2016-071228 | | 5/2016 | | |
| WO | WO-2016112594 A1 | * | 7/2016 | ....... | G02F 1/134327 |

* cited by examiner

DISPLAY DEVICE COMPRISING A FIRST DISPLAY ELECTRODE, A FIRST ELECTRODE, AND AN INSULATING FILM INCLUDING AN INORGANIC INSULATING FILM AND AN ORGANIC INSULATING FILM

CROSS-REFERENCE TO RELATED APPLICATION

The present application claims priority from Japanese Patent Application No. 2017-065324 filed on Mar. 29, 2017, the content of which is hereby incorporated by reference into this application.

TECHNICAL FIELD OF THE INVENTION

The present invention relates to a display device and for example, relates to a technique effectively applied to a display device in which an electrode is disposed in a peripheral region outside a display region.

BACKGROUND OF THE INVENTION

There is a technique for preventing ions from gathering in a display region by supplying an electrical potential to an electrode (trap electrode) disposed in a peripheral region outside the display region. For example, Japanese Patent Application Laid-Open Publication No. 2014-201941 (Patent Document 1) discloses a liquid display device provided with a trap electrode in a non-display region.

SUMMARY OF THE INVENTION

However, according to study by the present inventor, it became clear that, even when an electrode is disposed in the peripheral region, an influence of deteriorating display quality in the display region may be caused.

It is an object of the present invention to provide a technique for improving performance of a display device.

A display device according to one aspect of the present invention includes: an insulating substrate having a display region and a peripheral region outside the display region; a light shielding film overlapping with the peripheral region; a liquid crystal layer; an insulating film between the liquid crystal layer and the insulating substrate; an alignment film between the insulating film and the liquid crystal layer and having a front surface in contact with the liquid crystal layer; a first display electrode between the insulating film and the alignment film in the display region and having a front surface in contact with the alignment film; and a first electrode between the insulating film and the alignment film in the peripheral region and having a front surface in contact with the alignment film. Also, the first electrode is supplied with an electric potential in the peripheral region. Each of the alignment film, the first display electrode, and the first electrode is formed on the insulating film. A distance from the insulating substrate to the front surface of the first electrode is longer than a distance from the insulating substrate to the front surface of the first display electrode.

Moreover, a display device according to another aspect of the present invention includes: an insulating substrate having a display region and a peripheral region outside the display region; a light shielding film overlapping with the peripheral region; a liquid crystal layer; an insulating film between the liquid crystal layer and the insulating substrate; an alignment film between the insulating film and the liquid crystal layer and having a front surface in contact with the liquid crystal layer; a first display electrode between the insulating film and the alignment film in the display region and having a front surface in contact with the alignment film; and a first electrode between the insulating film and the alignment film in the peripheral region and having a front surface in contact with the alignment film. The first electrode is supplied with an electric potential in the peripheral region. Each of the alignment film, the first display electrode, and the first electrode is formed on the insulating film. The alignment film includes a first portion not overlapping with the first display electrode in the display region, a second portion overlapping with the first display electrode in the display region, and a third portion overlapping with the first electrode in the peripheral region. A thickness of the third portion of the alignment film is smaller than a thickness of the second portion of the alignment film.

BRIEF DESCRIPTIONS OF THE DRAWINGS

DESCRIPTIONS OF THE PREFERRED EMBODIMENTS

Figure 1:
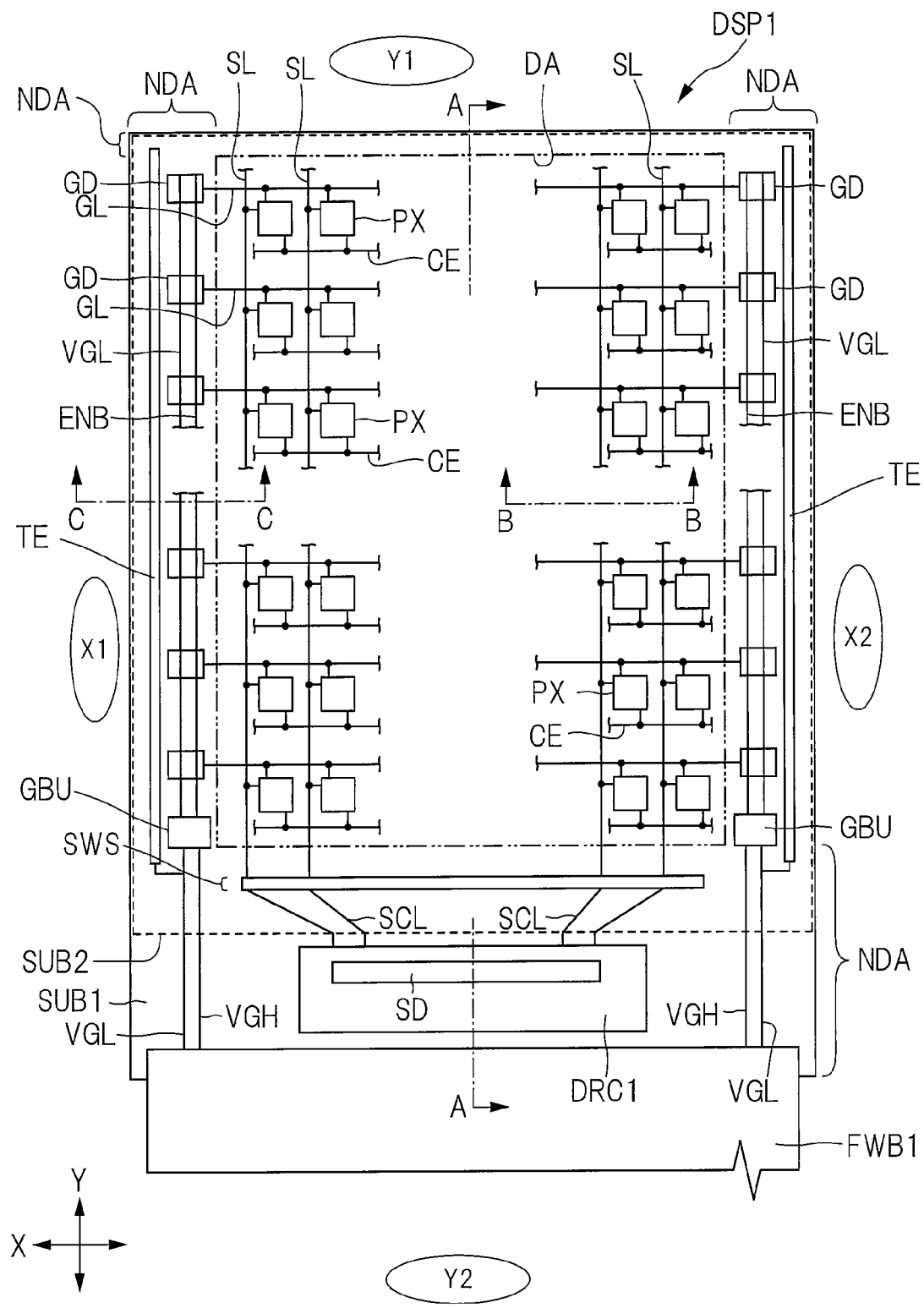
FIG. 1 is a plan view illustrating an example of a display device according to an embodiment.

In the following, each embodiment of the present invention will be described with reference to the drawings. Note that this disclosure is an example only and suitable modifications which can be easily conceived by those skilled in the art without departing from the gist of the present invention are included within the scope of the invention as a matter of course. In addition, in order to further clarify the description, a width, a thickness, a shape, and the like of respective portions may be schematically illustrated in the drawings as compared to aspects of the embodiments, but they are examples only and do not limit the interpretation of the present invention. In addition, in this specification and the respective drawings, the same components described in the drawings which have been described before are denoted by the same or related reference characters, and detailed description thereof may be omitted as needed.

In an embodiment below, description will be given by taking a liquid crystal display device provided with a liquid crystal layer as an example of a display device. Further, the liquid crystal display device is roughly categorized into two according to an application direction of an electric field for changing alignment of liquid crystal molecules in the liquid crystal layer serving as a display function layer. That is, a first category is a so-called vertical electric field mode in which an electric field is applied in a thickness direction (or an out-of-plane direction) of the display device. In the vertical electric field mode, there are, for example, a twisted nematic (TN) mode, a vertical alignment (VA) mode, and the like. Further, a second category is a so-called horizontal electric field mode in which an electric field is applied in a planar direction (or an in-plane direction) of the display device. In the horizontal electric field mode, there are, for example, in-plane switching (IPS) modes, a fringe field switching (FFS) mode that is one of the IPS modes, and the like. The technique described below is applicable to both of the vertical electric field mode and the horizontal electric field mode; however, in the embodiment described below, description will be given by taking the display device of the horizontal electric field mode, by way of example.

Configuration of Display Device

Figure 2:
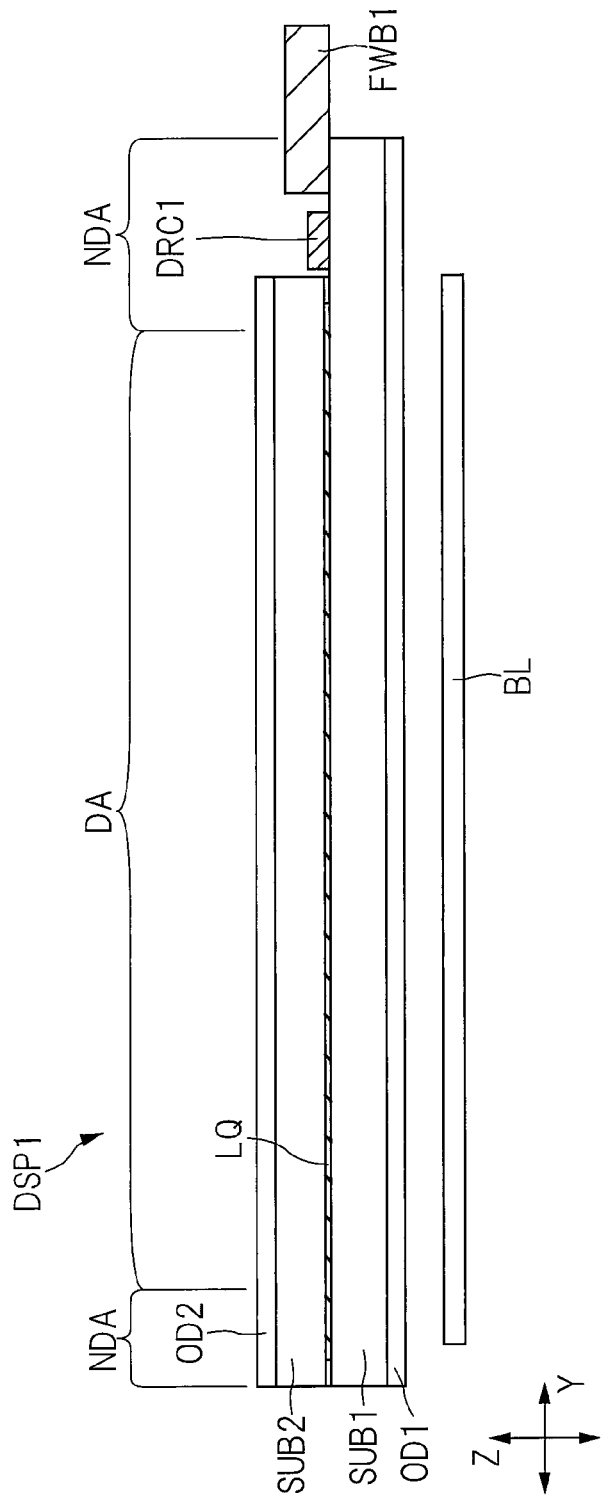
FIG. 2 is a cross-sectional view taken along a line A-A of FIG. 1.
Figure 3:
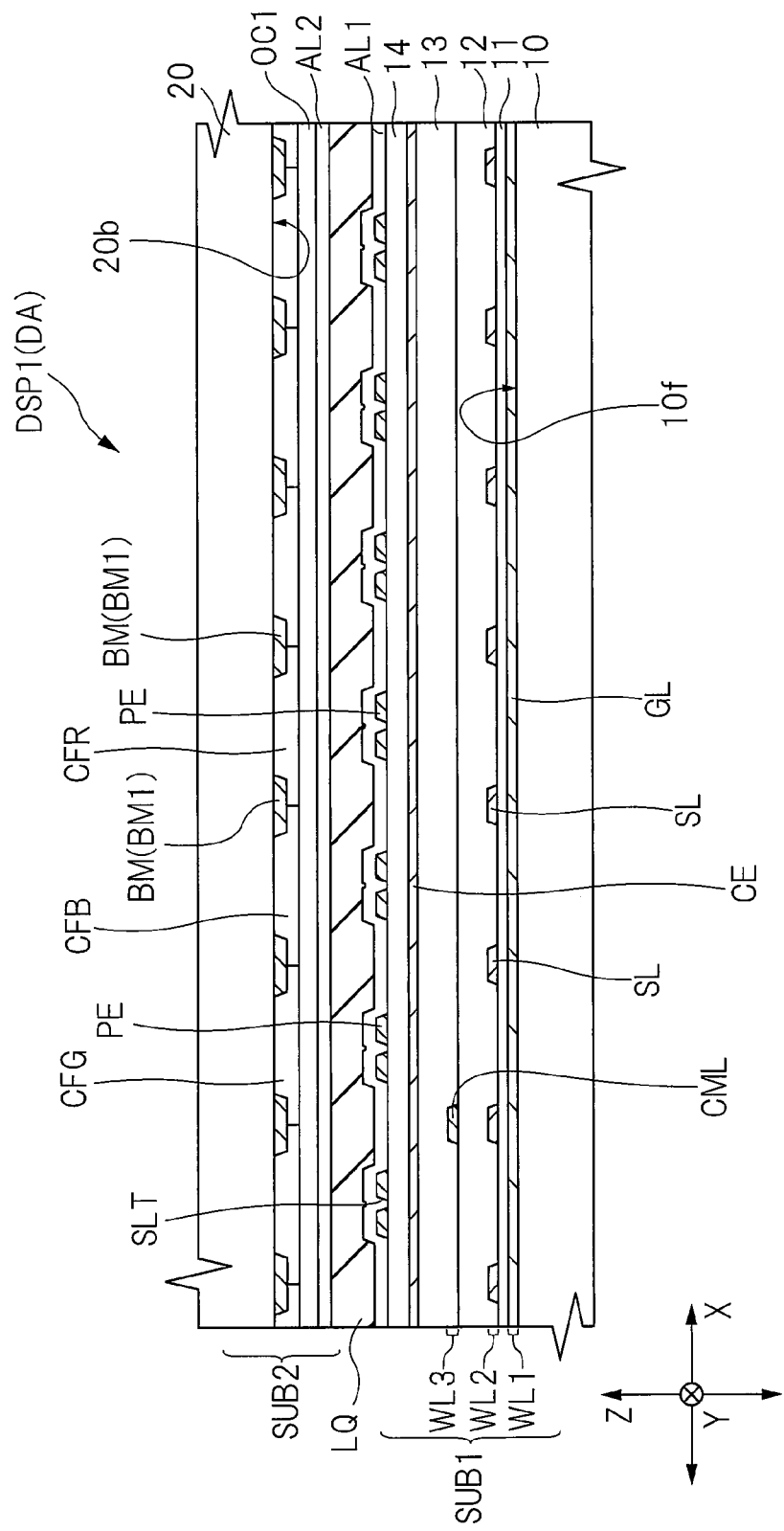
FIG. 3 is an enlarged cross-sectional view taken along a line B-B of FIG. 1.
Figure 4:
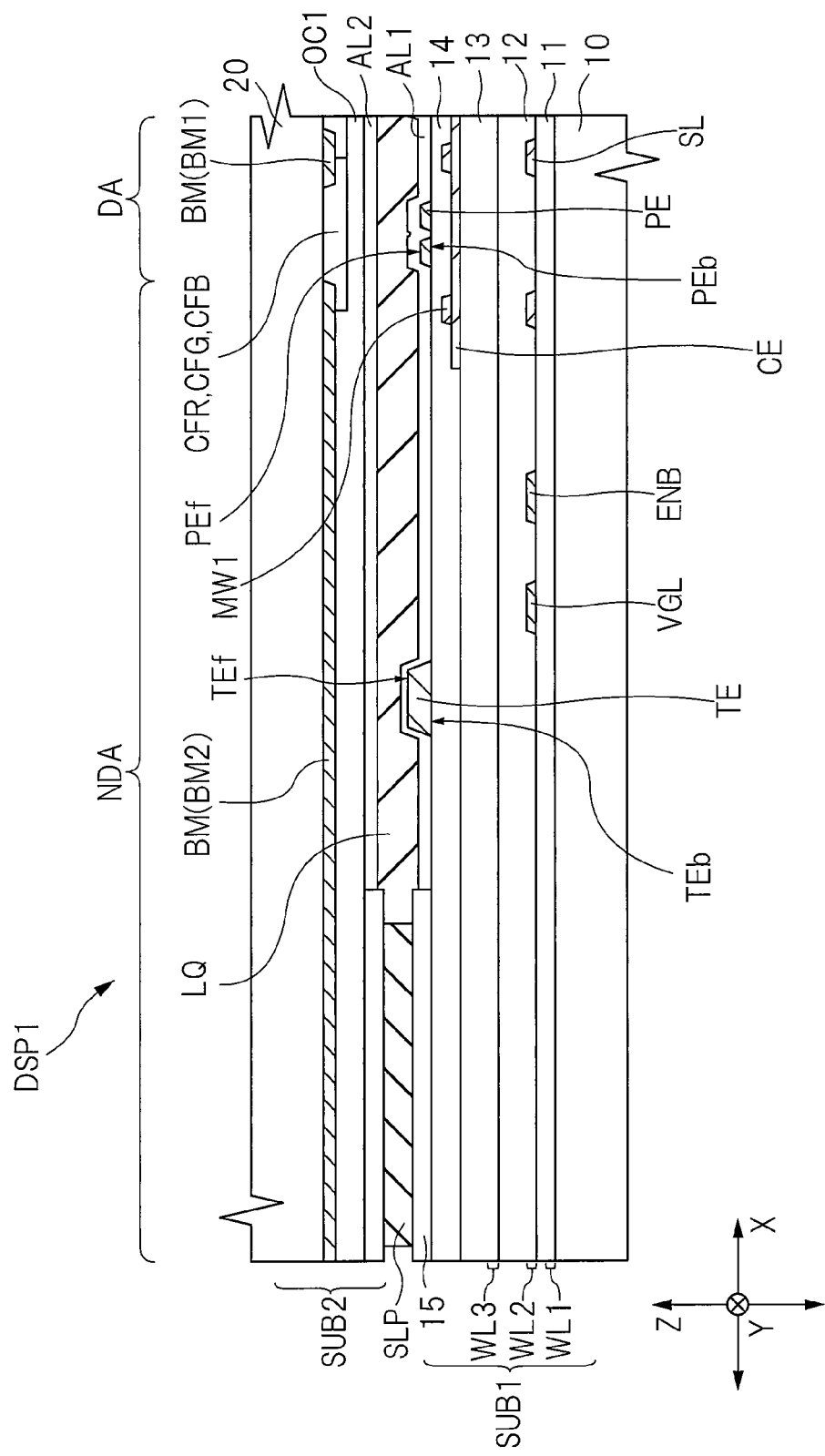
FIG. 4 is an enlarged cross-sectional view taken along a line C-C of FIG. 1.
Figure 5:
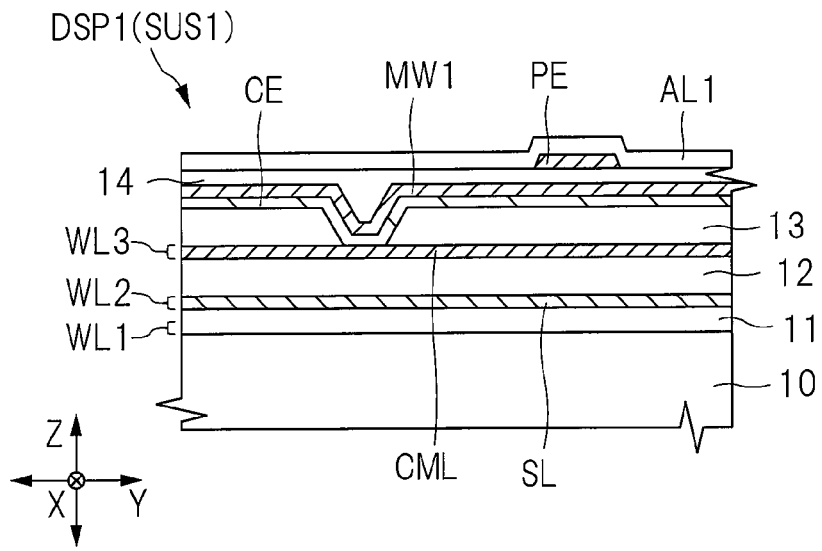
FIG. 5 is an enlarged cross-sectional view at a position where a common electrode and a common line illustrated in FIG. 3 are electrically connected.
Figure 6:
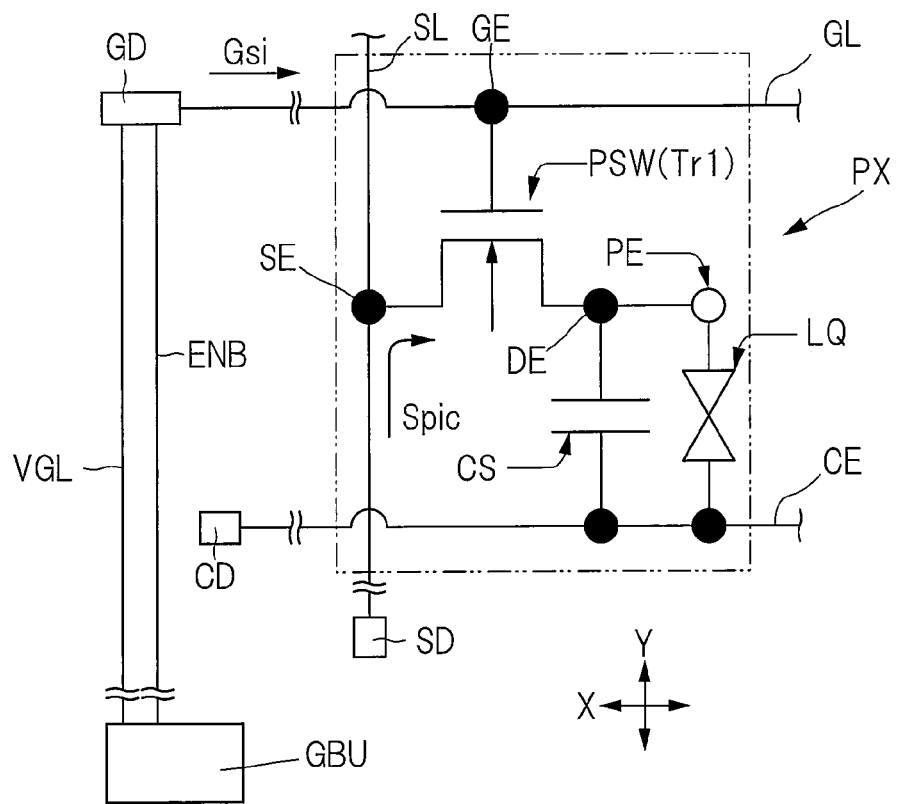
FIG. 6 is a circuit diagram illustrating an exemplary circuit configuration in a periphery of one pixel in the display device illustrated in FIG. 1.

First, a configuration of the display device will be described. FIG. 1 is a plan view illustrating an example of the display device according to this embodiment. FIG. 2 is a cross-sectional view taken along a line A-A of FIG. 1. Also, FIG. 3 is an enlarged cross-sectional view taken along a line B-B of FIG. 1. Also, FIG. 4 is an enlarged cross-sectional view taken along a line C-C of FIG. 1. FIG. 5 is an enlarged cross-sectional view at a position where a common electrode and a common line illustrated in FIG. 3 are electrically connected. Also, FIG. 6 is a circuit diagram illustrating an exemplary circuit configuration in a periphery of one pixel in the display device illustrated in FIG. 1.

Note that, in FIG. 1, a boundary between a display region DA and a peripheral region NDA in a plan view is indicated with a two-dot chain line. Further, in FIG. 1, a part of a circuit block and a wiring formed in a substrate SUB1 is schematically indicated with a solid line. Further, in FIG. 1, an outline of a substrate SUB2 disposed so as to face the substrate SUB1 is indicated with a dotted line. Further, in FIG. 2, which is a cross-sectional view, hatching is omitted except for a liquid crystal layer LQ, a driver chip DRC1, and a wiring board FWB1 for viewability. Similarly, in FIGS. 3 and 4, hatching is omitted except for conductive members such as a wiring and an electrode, the liquid crystal layer LQ, a sealing portion SLP (see FIG. 4), and a light shielding film BM. Further, in FIG. 3, in order to exemplify a positional relation between a scanning line GL and a signal line SL in a thickness direction of the substrate SUB1 (Z direction in FIG. 3), the scanning line GL provided in a cross-section different from FIG. 3 is also illustrated.

As illustrated in FIG. 1, a display device DSP1 according to this embodiment includes the display region DA in which an image is formed according to an input signal supplied from the outside. Further, the display device DSP1 includes a peripheral region (non-display region, frame region) NDA provided so as to surround a periphery of the display region DA in a plan view. Note that the display region DA of the display device DSP1 illustrated in FIG. 1 is a quadrangle; however, the display region may also have a shape other than the quadrangle, such as a polygon and a circle.

Further, as illustrated in FIG. 2, the display device DSP1 includes the substrate SUB1 and the substrate SUB2 that are stuck together so as to face each other interposing the liquid crystal layer LQ. The substrate SUB1 is an array substrate in which a plurality of transistors as a switching element (active element) are disposed in an array. Further, the substrate SUB2 is a substrate provided on a display surface side. The substrate SUB2 may also be referred to as a counter substrate in a sense that it is a substrate disposed counter to the array substrate. Further, the liquid crystal layer LQ is an electro-optical layer and has a function of modulating light passing therethrough by controlling a state of an electric field formed around the liquid crystal layer LQ.

Further, as illustrated in FIG. 2, the display device DSP1 includes an optical element OD1 and an optical element OD2. The optical element OD1 is disposed between the substrate SUB1 and a back light unit BL. The optical element OD2 is disposed on the display surface side of the substrate SUB2, that is, on a side opposite to the substrate SUB1 interposing the substrate SUB2. The optical element OD1 and the optical element OD2 each include at least a polarizing plate and may also include a wave plate as necessary.

As illustrated in FIG. 3, the substrate SUB1 includes a substrate (base substrate, insulating substrate) 10. Further, the substrate SUB2 includes a substrate (base substrate, insulating substrate) 20. Each of the substrates 10 and 20 is made of, for example, glass or a transparent resin material and has characteristics of allowing visible light to transmit therethrough. Further, the substrates SUB1 and SUB2 (in other words, the substrates 10 and 20) are stuck together in a state of being separated from each other. The substrates SUB1 and SUB2 are bonded together via a bonding layer (sealing portion SLP illustrated in FIG. 4) disposed in the peripheral region NDA (see FIG. 1). The liquid crystal layer LQ is sealed between the substrate SUB1 and the substrate SUB2.

Further, the substrate SUB1 includes a plurality of conductor patterns disposed between the substrate 10 and the substrate SUB2. The plurality of conductor patterns include a plurality of scanning lines (gate lines) GL, a plurality of signal lines (source lines) SL, a common line (metal wiring) CML, a common electrode CE, and a plurality of pixel electrodes PE. Further, an insulating film is interposed between the plurality of conductor patterns. The insulating film disposed between the adjacent conductor patterns so as to insulate the conductor patterns from each other includes insulating films 11, 12, 13, and 14 and an alignment film AL1. Note that, in FIG. 3, one for each of the scanning lines GL, the common electrode CE, and the common line CML is illustrated.

Each of the plurality of conductor patterns described above is formed in each of a plurality of wiring layers that is stacked. In the example illustrated in FIG. 3, the common electrode (display electrode) CE and the pixel electrodes (display electrodes) PE are respectively formed in different layers, and below a layer in which the common electrode CE is formed, three wiring layers WL1, WL2, and WL3 are provided in order from a substrate 10 side.

Among the three wiring layers formed on the substrate 10, mainly the scanning lines GL are formed in the wiring layer WL1, which is a first layer provided closest to the substrate 10. The conductor pattern formed in the wiring layer WL1 is made of, for example, a metal such as chromium (Cr), titanium (Ti), or molybdenum (Mo) or an alloy thereof. Further, the insulating film 11 is on the substrate 10 side and is an insulating film covering the conductor pattern formed in the wiring layer WL1. The insulating film 11 is, for example, a transparent inorganic insulating film such as silicon nitride or silicon oxide.

As illustrated in FIG. 1, each of the plurality of scanning lines GL extends in an X direction. Further, the plurality of scanning lines GL are arranged to be spaced from one another in a Y direction. In other words, the plurality of scanning lines GL are arranged from a Y1 side, which is one side in the Y direction, toward a Y2 side, which is the other side therein. Each of the plurality of scanning lines GL is drawn out to the peripheral region NDA outside the display region DA and is connected to a scanning line driving circuit (gate driving circuit) GD. The scanning line driving circuit GD is a scanning signal output circuit that outputs a scanning signal Gsi to be input to each of the plurality of scanning lines GL (see FIG. 6). The scanning line driving circuit GD is provided to the substrate SUB1 in the peripheral region NDA.

Further, as illustrated in FIG. 1, the scanning line driving circuit GD is connected with a wiring ENB to which an enable signal is supplied and with a wiring VGL to which a negative potential is supplied. The enable signal, which is a control signal of the scanning line driving circuit GD, is generated in a buffer circuit GBU and is transmitted to the scanning line driving circuit GD through the wiring ENB. The buffer circuit GBU generates the enable signal using a negative potential, which is supplied to the wiring VGL, and a positive potential, which is supplied to a wiring VGH. In the example illustrated in FIG. 1, each of the wirings VGH and VGL is connected to the wiring board FWB1 and is supplied from a power supply circuit connected to the wiring board FWB1.

In the example illustrated in FIG. 4, each of the wiring VGL and the wiring ENB is formed in the wiring layer WL2. The conductor pattern formed in the wiring layer WL2 is made of, for example, a metal film having a multilayer structure in which aluminum (Al) is sandwiched between molybdenum (Mo), titanium (Ti), or the like. Therefore, it is possible to reduce wiring impedance compared to that of the conductor pattern formed in the wiring layer WL1. Meanwhile, in a modification, each of the wiring VGL and the wiring ENB may be formed, for example, in the wiring layer WL1 or the wiring layer WL3.

Further, between the substrate 10 and the insulating film 11 illustrated in FIG. 3, in addition to the scanning lines GL, there are formed a gate electrode GE, a semiconductor layer, and the like of a transistor Tr1 as a pixel switching element PSW illustrated in FIG. 6. The transistor Tr1 is a thin film transistor (TFT). Further, each of the scanning lines GL includes the gate electrode GE of the transistor Tr1 as the pixel switching element PSW.

As illustrated in FIG. 3, over the insulating film 11, the wiring layer WL2, which is a second layer, is provided. In the wiring layer WL2, mainly the signal lines SL are formed. Further, a source electrode SE, a drain electrode DE, and the like of the pixel switching element PSW illustrated in FIG. 6 are also formed on the insulating film 11. The insulating film 12 is formed on each of the signal lines SL and the insulating film 11. The insulating films 12, 13, and 14 are organic insulating films made of, for example, an acrylic photosensitive resin and the like.

As illustrated in FIG. 1, each of the plurality of signal lines (video signal lines) SL extends in the Y direction. Further, the plurality of signal lines SL are arranged to be spaced from one another in the X direction. In other words, the plurality of signal lines SL are arranged from an X1 side, which is one side in the X direction, toward an X2 side, which is the other side therein. Each of the plurality of signal lines SL is drawn out to the peripheral region NDA outside the display region DA. Each of the plurality of signal lines SL is electrically connected to the driver chip DRC1 through a signal connection wiring SCL as a connecting wiring (also referred to as a lead-out wiring) connecting the signal lines SL in the display region DA and the driver chip DRC1 with each other. The driver chip DRC1 includes a signal line driving circuit SD that drives the liquid crystal layer LQ (see FIG. 3) through the signal lines SL. The signal line driving circuit SD supplies an video signal Spic (see FIG. 6) to the pixel electrode PE (see FIG. 6) provided to each of a plurality of pixels PX through the signal line SL.

Of the video signal lines that are connected to the driver chip DRC1 and are signal transmission paths for supplying a video signal to the plurality of pixels PX, a portion (wiring portion) at a position overlapping with the display region DA is referred to as the signal line SL. Further, of the video signal lines, a portion (wiring portion) outside the display region DA is referred to as the signal connection wiring SCL. Each of the plurality of signal lines SL extends in the Y direction. Meanwhile, the signal connection wiring SCL is a wiring connecting the signal lines SL with the driver chip DRC. Therefore, as illustrated in FIG. 1, the plurality of signal connection wirings SCL extend radially from a group of terminals (not illustrated) to be connected to the driver chip DRC1 toward the display region DA.

Further, in the example illustrated in FIG. 1, there is a switch circuit portion SWS between the signal lines SL and the signal connection wiring SCL. The switch circuit portion SWS is, for example, a multiplexer circuit that outputs a signal input by selecting the signal line SL for each color. The switch circuit portion SWS operates as a selection switch selecting a type of video signal, for example, a red signal, a green signal, or a blue signal. In this case, the number of the signal connection wirings SCL connecting the switch circuit portion SWS with the driver chip DRC1 may be smaller than the number of the signal lines SL. In this way, providing the switch circuit portion SWS can reduce the number of the signal connection wirings SCL, so that the number of the signal connection wirings SCL can be reduced between the driver chip DRC1 and the switch circuit portion SWS.

As illustrated in FIG. 3, over the insulating film 12, the wiring layer WL3, which is a third layer, is formed. In the wiring layer WL3, mainly the common line CML is formed. Similarly to the wiring layer WL2, the conductor pattern formed in the wiring layer WL3 is made of, for example, a metal film having a multilayer structure in which aluminum (Al) is sandwiched between molybdenum (Mo), titanium (Ti), or the like. In the example illustrated in FIG. 3, the common line CML extends in the Y direction. The insulating film 13 is formed on each of the common line CML and the insulating film 12.

The common electrode CE is formed on the insulating film 13. The common electrode CE is supplied with a driving electric potential common to the plurality of pixels PX (see FIG. 1) during a display period in which the display device DSP1 displays an image. Therefore, the common electrode CE is disposed all over the display region DA. There are various implementation modes relative to the number of the common electrodes CE. For example, there may be one common electrode CE in the display region DA or a plurality of common electrodes CE in the display region DA. Preferably, the common electrode CE is made of a transparent conductive material such as indium tin oxide (ITO) and indium zinc oxide (IZO).

In a cross-section illustrated in FIG. 3, the insulating film 13 is interposed between the common electrode CE and the common line CML. However, as illustrated in FIG. 5, the common line CML and the common electrode CE are electrically connected to each other as a part of the common line CML and a part of the common electrode CE are in contact with each other. The common electrode CE is electrically connected to a common electrode driving circuit CD (see FIG. 6) through the common line CML. The common electrode driving circuit CD is a circuit that supplies the common electrode CE with a common electric potential during the display period. Although not illustrated in FIG. 1, the common electrode driving circuit CD illustrated in FIG. 6 is formed in the wiring board (flexible wiring board) FWB1 connected to the substrate SUB1 illustrated in FIG. 1. Note that, as in the example illustrated in FIG. 5, a metal wiring MW1 may be formed on the common electrode CE at a position overlapping with the signal line SL. By providing the metal wiring MW1, for example, it is possible to adjust a resistance value of the common electrode CE. Further, in the example illustrated in FIG. 5, the metal wiring MW1 is formed between the common electrode CE and the insulating film 14; however, the metal wiring MW1 may also be formed between the common electrode CE and the insulating film 13.

Further, the insulating film 14 is formed above the insulating film 13 and the common electrode CE. The pixel electrodes PE are formed on the insulating film 14. In a plan view, each of the pixel electrodes PE is positioned between two signal lines SL adjacent to each other. In the example illustrated in FIG. 3, each of the plurality of pixel electrodes PE is disposed at a position facing the common electrode CE. Further, in the example illustrated in FIG. 3, each of the plurality of pixel electrodes PE includes a plurality of portions adjacent to each other interposing a slit SLT. As in this embodiment, in a case where the pixel electrodes PE and the common electrode CE are formed in different layers, due to presence of the slit SLT, some of a plurality of electrical flux lines pass through the slit SLT. Accordingly, electric field intensity of the electric field formed in the liquid crystal layer LQ is increased, whereby it is easier to drive liquid crystal molecules.

Note that it is not necessary for the pixel electrode PE and the common electrode CE to face each other as long as the electric field for driving the liquid crystal molecules is formed when an electric potential is supplied to the pixel electrode PE and the common electrode CE. For example, as a modification to this embodiment, the plurality of common electrodes CE and the plurality of pixel electrodes PE may also be formed on the same surface (e.g. over the insulating film 13) and may be alternately arranged so as to be adjacent to each other. Preferably, the pixel electrode PE is made of, for example, a transparent conductive material or a metal material such as ITO and IZO. The alignment film AL1 covers the pixel electrodes PE and the insulating film 14. The alignment film AL1 and an alignment film AL2 are organic insulating films provided with a function of making initial alignment of the liquid crystal molecules contained in the liquid crystal layer LQ, and the alignment films may be made of, for example, a polyimide resin.

Each of the plurality of pixels PX illustrated in FIG. 1 includes the pixel switching element PSW and the pixel electrode PE as illustrated in FIG. 6. The source electrode SE of the transistor Tr1, which is the pixel switching element PSW, is connected to the signal line SL, and the drain electrode DE thereof is connected to the pixel electrode PE. During the display period, the scanning line driving circuit GD supplies the scanning signal Gsi to the gate electrode GE and controls a supply state of the video signal Spic to the pixel electrode PE by turning on and off the pixel switching element PSW. In other words, the transistor Tr1 functions as the pixel switching element PSW that controls electric potential supply to the pixel electrode PE. The pixel switching element PSW may be either a top gate type TFT or a bottom gate type TFT. Further, the semiconductor layer of the pixel switching element PSW is made of, for example, polycrystalline silicon (polysilicon); however, it may also be made of amorphous silicon.

Further, as illustrated in FIG. 3, between the pixel electrode PE and the common electrode CE, the insulating film 14 functioning as a dielectric material is interposed. The common electrode CE, the insulating film 14, and the pixel electrode PE constitute a holding capacitor CS illustrated in FIG. 6. During a display operation period in which a display image is formed based on the video signal, between the pixel electrode PE and the common electrode CE, an electric field is formed based on a driving signal applied to each of the electrodes. Then, the liquid crystal molecules constituting the liquid crystal layer LQ, which is an electro-optical layer, are driven by the electric field that has been formed between the pixel electrode PE and the common electrode CE. For example, in the display device DSP1 using the horizontal electric field mode as in this embodiment, as illustrated in FIG. 3, the pixel electrode PE and the common electrode CE are provided in the substrate SUB1. The liquid crystal molecules constituting the liquid crystal layer LQ are rotated by using the electric field (for example, an electric field substantially parallel to a principal surface of the substrate, among fringe electric fields) formed between the pixel electrode PE and the common electrode CE. That is, during the display period, each of the pixel electrode PE and the common electrode CE operates as a driving electrode that drives the liquid crystal layer LQ, which is an electro-optical layer.

Further, as illustrated in FIG. 3, the substrate SUB2 includes the light shielding film BM, color filters CFR, CFG, and CFB, an insulating film OC1, and the alignment film AL2 that are on a surface (back surface) 20b side facing the substrate SUB1 of the substrate 20.

The color filters CFR, CFG, and CFB are formed on the surface 20b side facing the substrate SUB1. In the example illustrated in FIG. 3, the color filters CFR, CFG, and CFB of three colors of red (R), green (G), and blue (B) are periodically arranged. In a color display device, for example, a set of subpixels of three colors of red (R), green (G), and blue (B) constitutes one pixel. Each of the plurality of color filters CFR, CFG, and CFB of the substrate SUB2 is disposed at a position facing each of the subpixels having the pixel electrode PE formed in the substrate SUB1. Note that the pixel PX illustrated in FIG. 6 (each of the plurality of pixels PX illustrated in FIG. 1) corresponds to one subpixel. Further, it is not limited that one pixel is constituted by three colors of red (R), green (G), and blue (B).

Further, to each of boundaries between the color filters CFR, CFG, and CFB of each of the colors, a light shielding film BM1 is disposed. The light shielding film BM1 is referred to as a black matrix and is made of, for example, a black resin or a metal with low reflectivity. The light shielding film BM1 is formed into, for example, a grid shape in a plan view. In other words, the light shielding film BM1 extends in the X direction and the Y direction. More specifically, the light shielding film BM1 includes a plurality of portions extending in the Y direction and a plurality of portions extending in the X direction crossing the Y direction. By partitioning each of the pixels PX with the black matrix, it is possible to prevent light leakage and color mixture.

Further, as illustrated in FIG. 4, a light shielding film BM2 is formed entirely in the peripheral region NDA of the substrate SUB2. In other words, the peripheral region NDA overlaps with the light shielding film BM2. The display region DA is specified as a region inside the peripheral region NDA. Also, the peripheral region NDA is a region overlapping with the light shielding film BM2 that blocks light emitted from the back light unit (light source) BL illustrated in FIG. 2. The light shielding film BM1 is formed in the display region DA, and in the display region DA, a plurality of openings are formed in the light shielding film BM1. In general, among the openings formed in the light shielding film BM1 and from which the color filters are exposed, an end of the opening that is formed closest to a peripheral edge portion side is specified as a boundary between the display region DA and the peripheral region NDA.

Further, the insulating film OC1 illustrated in FIG. 3 covers the color filters CFR, CFG, and CFB. The insulating film OC1 functions as a protective film that prevents diffusion of impurities from the color filters to the liquid crystal layer. The insulating film OC1 is an organic insulating film made of, for example, an acrylic photosensitive resin and the like.

Further, as illustrated in FIG. 4, in the peripheral region NDA, the substrate SUB1 and the substrate SUB2 are bonded and fixed together interposing the sealing portion (sealing material) SLP disposed between the substrate SUB1 and the substrate SUB2. The sealing portion SLP has a function as a bonding member for bonding and fixing the substrate SUB1 and the substrate SUB2 together. Further, the liquid crystal layer LQ is sealed in a region surrounded by the sealing portion SLP. The sealing portion SLP functions as a sealing material for preventing leakage of the liquid crystal layer LQ.

In the example illustrated in FIG. 4, between the sealing portion SLP and the insulating film 14, an insulating film (organic insulating film) 15 is disposed, and an end of the alignment film AL1 is positioned on an inner side of the insulating film 15. Therefore, there is no alignment film AL1 between the sealing portion SLP and the insulating film 14.

Further, as illustrated in FIGS. 1 and 4, an electrode TE extending along the Y direction is disposed in the peripheral region NDA. The electrode TE is supplied with an electric potential (negative potential in this embodiment), and it functions as a trap electrode that gathers ionic impurities present in the liquid crystal layer LQ (see FIG. 4) in the peripheral region NDA and prevents diffusion of the impurities into the display region DA. Details of the electrode TE will be described below.

Trap Electrode

Next, details of the electrode TE illustrated in FIGS. 1 and 4 will be described. In the liquid crystal layer LQ illustrated in FIG. 4, in addition to the liquid crystal molecules, impurities having entered from the sealing portion SLP, the alignment films AL1 and AL2, and the like may be present. In a case where such impurities are charged and are distributed in the display region DA as ionic impurities in large quantities, the electric field that drives the liquid crystal molecules is disturbed by an influence of ions, which may cause deterioration in display quality. For example, black unevenness may be caused due to a partial decrease in display brightness.

Thus, in the display device DSP1 according to this embodiment, the electrode TE is disposed in the peripheral region NDA. When the electric potential is supplied to the electrode TE, by the Coulomb force, the ions gather in the vicinity of the electrode TE. Accordingly, it is possible to prevent the ions from diffusing to the display region DA. For example, in this embodiment, the electrode TE is electrically connected with the wiring VGL and is supplied with the negative potential. In this case, it is possible to trap positively-charged ionic impurities in the peripheral region NDA. Note that various modifications are possible relative to the electric potential supplied to the electrode TE. For example, in the case of gathering negatively-charged ionic impurities, a positive potential is preferably supplied. Hereinafter, gathering of the ionic impurities in the vicinity of the electrode TE and preventing movement thereof to the display region DA is called a trap or an ion trap. Further, the electrode TE having a function to trap the ionic impurities may be referred to as a trap electrode.

As illustrated in FIG. 1, the display device DSP1 includes a plurality of (two in FIG. 1) electrodes TE. Each of the plurality of electrodes TE extends along the Y direction. Further, in the X direction, the electrodes TE are disposed in each of the peripheral region NDA on the X1 side of the display region DA and the peripheral region NDA on the X2 side of the display region DA. In this case, the ionic impurities distributed in the display region DA move toward nearer one of the peripheral region NDA on the X1 side of the display region DA and the peripheral region NDA on the X2 side of the display region DA. As a result, it is possible to reduce density of the ionic impurities remaining in the display region DA.

Further, a length of the electrodes TE in the Y direction is equal to or longer than a length of the display region DA in the Y direction. In this case, it is possible to reduce the density of the ionic impurities remaining in the display region DA in the entire display region DA.

Figure 7:
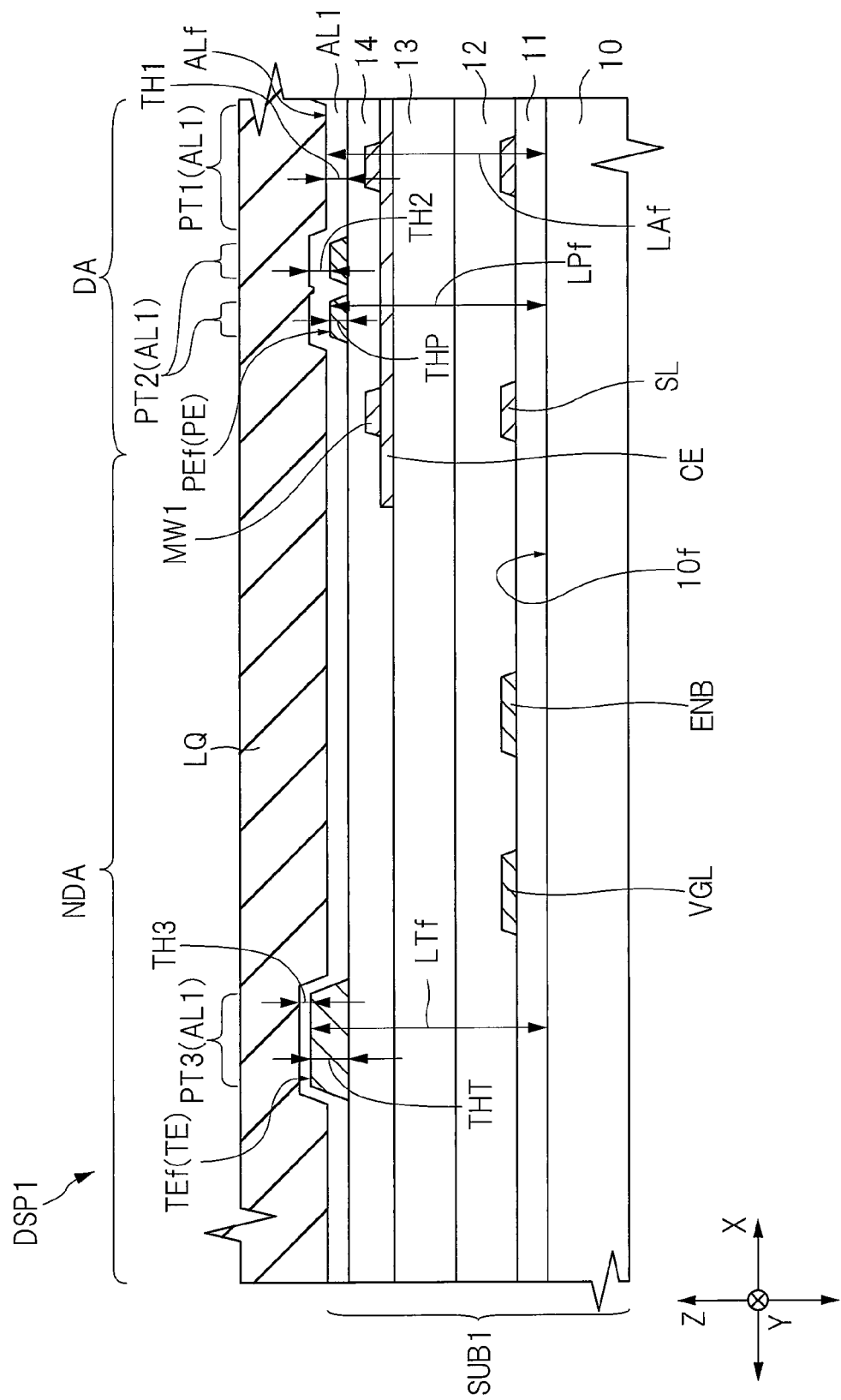
FIG. 7 is an enlarged cross-sectional view illustrating a periphery of a trap electrode and a pixel electrode illustrated in FIG. 4 in a further enlarged manner.

Further, the electrodes TE are electrodes that trap the ionic impurities present in the liquid crystal layer LQ illustrated in FIG. 4. Therefore, in order to efficiently perform the ion trap by the electrodes TE, the electrodes TE are preferably formed near the liquid crystal layer LQ. In this embodiment, as illustrated in FIG. 7, each of the electrodes TE is formed in the same layer as the pixel electrode PE, that is, between the alignment film AL1 and the insulating film 14 (more specifically, over the insulating film 14). The pixel electrode PE has a front surface (foreside surface) PEf in contact with the alignment film AL1, and a back surface (rear surface) PEb positioned on an opposite side of the front surface PEf and in contact with the insulating film 14. Further, each of the electrodes TE has a front surface (foreside surface) TEf, which is in contact with the alignment film AL1, and a back surface (rear surface) TEb, which is positioned on an opposite side of the front surface TEf and is in contact with the insulating film 14. In this way, in a case where each of the electrodes TE is formed at the position in contact with the alignment film AL1, since a distance from the electrode TE to the liquid crystal layer LQ is short, efficiency of the ion trap is improved compared to a case where, for example, the electrodes TE are formed in the wiring layers WL1, WL2, WL3, or the like.

Further, from a viewpoint of improving the efficiency of the ion trap, a thickness of the alignment film AL1 covering the electrodes TE is preferably small. However, in a case where the thickness of the alignment film AL1 is uniformly small, an electric charge may concentrate at a portion where a strong electric field is generated in the vicinity of the pixel electrode PE, and the alignment film AL1 may be damaged due to the electric charge (referred to as a burn-in phenomenon). In particular, in the display device of the horizontal electric field mode as in this embodiment in which the common electrode CE and the pixel electrode PE are formed in the substrate SUB1, the electric charge tends to concentrate in the vicinity of the electrodes compared to the vertical electric field mode. Further, as illustrated in FIG. 3, in the display device of the FFS mode in which the pixel electrode PE and the common electrode CE are provided in the layer different from each other in the thickness direction, an oblique electric field (fringe electric field) having uneven strength as a whole is generated. Therefore, compared to the display device of the IPS mode in which the pixel electrode PE and the common electrode CE are provided in the same layer, a portion where electric field intensity is locally strong tends to be generated. As a result, in the display device of the FFS mode, the burn-in phenomenon tends to occur particularly in a case where the alignment film AL1 is small.

In this way, it became clear that the display quality may deteriorate in the display region DA due to the burn-in phenomenon when the efficiency of the ion trap by the electrodes TE disposed in the peripheral region NDA is intended to be improved. Thus, the present inventor has considered a technique for improving the efficiency of the ion trap and preventing occurrence of the burn-in phenomenon. As a result, as illustrated in FIG. 7, it became clear that the technique can be achieved by forming the alignment film AL1 such that, of the alignment film AL1, a thickness TH3 of a portion PT3 overlapping with the electrode TE is smaller than a thickness TH2 of a portion PT2 overlapping with the pixel electrode PE. FIG. 7 is an enlarged cross-sectional view illustrating a periphery of the trap electrode and the pixel electrode illustrated in FIG. 4 in a further enlarged manner.

As illustrated in FIG. 7, the alignment film AL1 includes a portion PT1 not overlapping with the pixel electrode PE in the display region DA. Further, the alignment film AL1 includes a portion PT2 overlapping with the pixel electrode PE in the display region DA (more specifically, overlapping with the front surface PEf of the pixel electrode PE). The alignment film AL1 includes a portion PT3 overlapping with the electrode TE in the peripheral region NDA (more specifically, overlapping with the front surface TEf of the electrode TE). Further, the thickness TH3 of the portion PT3 is smaller than the thickness TH2 of the portion PT2.

As in this embodiment, in a case where the thickness TH3 of the portion PT3 of the alignment film AL1 is small, since the distance between the electrode TE, which is the trap electrode, and the liquid crystal layer LQ is short, it is possible to efficiently trap the ionic impurities in the periphery of the electrode TE. Meanwhile, the thickness TH2 of the portion PT2 of the alignment film AL1 is greater than the thickness TH3 of the portion PT3 thereof and is, for example, substantially the same as a thickness TH1 of the portion PT1. In this case, it is possible to prevent concentration of the electric charge in the vicinity of the pixel electrode PE, whereby the burn-in phenomenon can be prevented.

Next, a configuration for controlling a thickness of each of the portions of the alignment film AL1 will be described. As illustrated in FIG. 7, in this embodiment, a height of the front surface TEf of the electrode TE is greater than a height of the front surface PEf of the pixel electrode PE. More specifically, a distance LTf from a surface (front surface) 10f of the substrate 10, which is an insulating substrate, to the front surface TEf of the electrode TE is longer than a distance LPf from the surface 10f of the substrate 10 to the front surface PEf of the pixel electrode PE. As described above, the alignment film AL1 is made of, for example, a resin such as polyimide and is formed, for example, as follows. A mixture of a raw resin of the alignment film AL1 and a solvent is prepared and is applied on the insulating film 14, which is an alignment film forming surface, on the electrode TE, and on the pixel electrode PE. At this time, since the mixture of the raw resin and the solvent is a low viscosity liquid, when there is unevenness on a surface to be coated, a thickness of a coating film made of the mixture may not be uniform. That is, on the surface to be coated, the liquid tends to gather in a place with a small height, whereby the thickness of the coating film covering the surface to be coated having a projected shape is formed to be smaller than the thickness of the coating film covering the surface to be coated having a recessed shape. When heating treatment is applied in this state, the solvent is volatilized, and a reaction (imidization reaction in the case of polyimide) progresses, whereby the alignment film AL1 is formed. Therefore, when the height of the front surface TEf of the electrode TE is greater than the height of the front surface PEf of the pixel electrode PE as in this embodiment, the thickness TH3 is smaller than the thickness TH2 as illustrated in FIG. 7.

Further, in the example illustrated in FIG. 7, a distance LAf from the surface 10f of the substrate 10 to the front surface (foreside surface) ALf of the portion PT1 of the alignment film AL1 is shorter than the distance LTf from the surface 10f of the substrate 10 to the front surface TEf of the electrode TE and is longer than the distance LPf from the surface 10f of the substrate 10 to the front surface PEf of the pixel electrode PE. In a case where the height of the front surface PEf of the pixel electrode PE is greater than the height of the front surface ALf of the portion PT1 of the alignment film AL1, expansion is suppressed when a raw material of the alignment film AL1 is applied, and a place where the thickness of the alignment film AL1 is locally small may be caused in the display region DA. However, as illustrated in FIG. 7, in a case where the distance LAf is longer than the distance LPf, the thickness of the alignment film AL1 in the display region DA can be stably made large.

Further, focusing on the thickness TH1 of the portion PT1 of the alignment film AL1 and a thickness THP of the pixel electrode PE illustrated in FIG. 7, it may also be expressed as follows. That is, the thickness THP of the pixel electrode PE is smaller than the thickness TH1 of the portion PT1 of the alignment film AL1. In other words, the thickness TH1 of the portion PT1 of the alignment film AL1 is greater than the thickness THP of the pixel electrodes PE. Accordingly, the thickness of the alignment film AL1 in the display region DA can be stably made large.

Further, a thickness THT of the electrode TE, which is the trap electrode, is greater than the thickness THP of the pixel electrodes PE and is greater than the thickness TH1 of the portion PT1 of the alignment film AL1. In this embodiment, the height of the front surface TEf of the electrode TE is made to be greater than that of the front surface PEf of the pixel electrode PE by increasing the thickness THT of the electrode TE. Further, in a case where the thickness THT of the electrode TE is greater than the thickness TH1 of the portion PT1, at the time of forming the alignment film AL1, a liquid including the raw resin of the alignment film AL1 tends to flow in the periphery of the electrode TE, whereby it is possible to reduce the thickness TH3 of the portion PT3.

Of the alignment film AL1, the thickness TH2 of the portion PT2 overlapping with the pixel electrode PE is preferably substantially the same as the thickness TH1 of the portion PT1. However, as illustrated in FIG. 7, the pixel electrode PE is formed on the insulating film 14, and over the insulating film 14, a portion where the pixel electrode PE is formed has a projected shape. Therefore, as described above, at the time of forming the alignment film AL1, the thickness of the coating film of the portion overlapping with the pixel electrode PE is smaller than the thickness thereof of a portion not overlapping with the pixel electrode PE. Therefore, the thickness TH2 of the portion PT2 of the alignment film AL1 is smaller than the thickness TH1 of the portion PT1 thereof. From a viewpoint of preventing the burn-in phenomenon described above, the thickness TH2 of the portion PT2 of the alignment film AL1 is preferably great. Further, in a case where the thickness THP of the pixel electrode PE is small, it is unlikely that the thickness TH2 of the portion PT2 becomes small at the time of forming the alignment film AL1. Therefore, the thickness TH2 of the portion PT2 of the alignment film AL1 is preferably greater than the thickness THP of the pixel electrode PE.

Note that the burn-in phenomenon can be prevented to some extent as long as the thickness TH2 of the portion PT2 of the alignment film AL1 and the thickness THP of the pixel electrode PE are substantially the same. In order to say that the thickness TH2 of the portion PT2 of the alignment film AL1 and the thickness THP of the pixel electrode PE are substantially the same, the thickness TH2 of the portion PT2 of the alignment film AL1 is preferably 70% or more and 130% or less of the thickness THP of the pixel electrodes PE.

Further, the electrode TE is formed in the same layer as the pixel electrode PE as descried above. Therefore, in a case where the electrode TE is formed of the same transparent conductive material as the pixel electrode PE, it is possible to collectively form the pixel electrode PE and the electrode TE. However, from the viewpoint of improving the efficiency of the ion trap described above, it is preferred that impedance of the electrode TE is reduced. From a viewpoint of reducing the impedance of the electrode TE, it is preferred that the electrode TE is made of a metal material.

Figure 8:
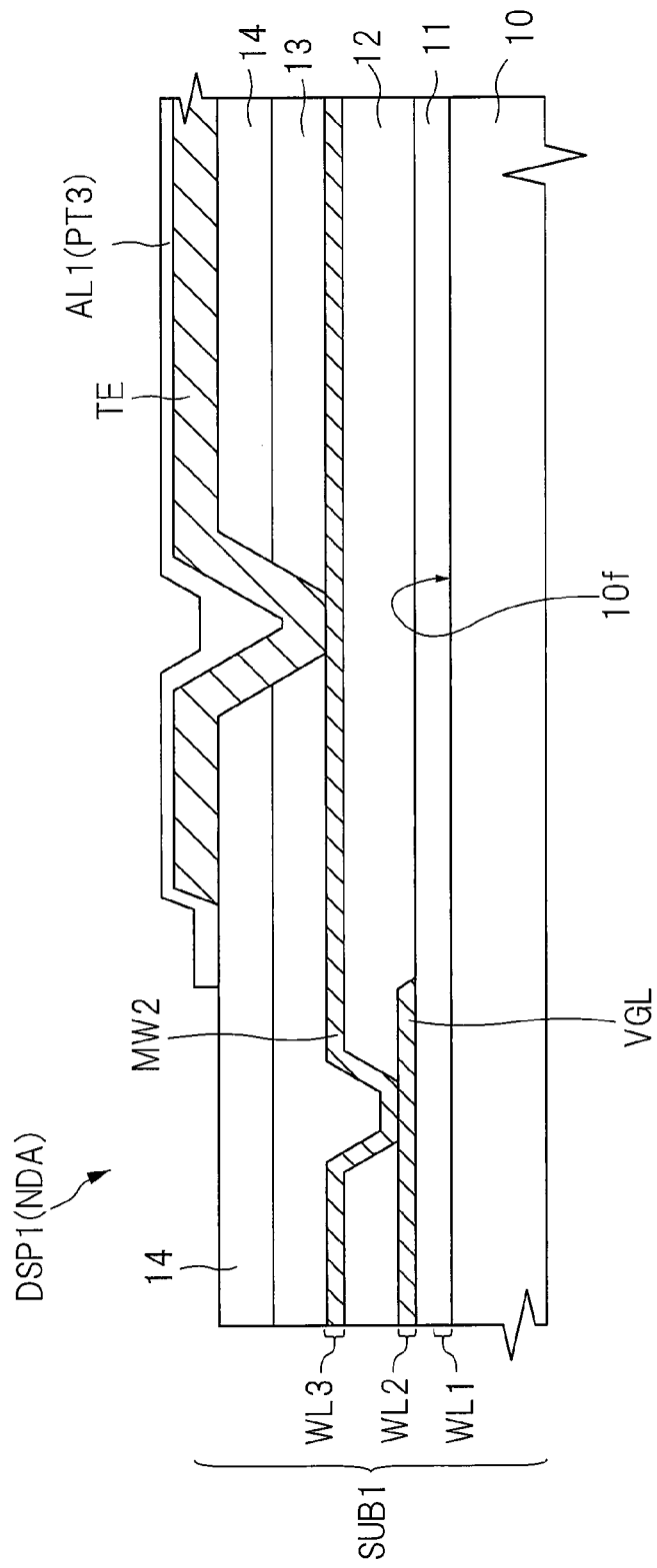
FIG. 8 is an enlarged cross-sectional view of a portion where the trap electrode illustrated in FIG. 4 and a wiring for supplying an electric potential to the trap electrode are electrically connected.

Further, from a viewpoint of reducing the impedance of a path for supplying the electric potential to the electrode TE, it is preferred that a wiring for supplying an electric potential to the electrode TE is also a metal wiring. FIG. 8 is an enlarged cross-sectional view of a portion where the trap electrode illustrated in FIG. 4 and a wiring for supplying an electric potential to the trap electrode are electrically connected. Note that FIG. 8 is a cross-sectional view along a wiring path connected to the electrode TE, whereby the X direction and the Y direction are not illustrated. In the example illustrated in FIG. 8, the electrode TE is electrically connected with the wiring VGL through a metal wiring MW2. The wiring VGL and the metal wiring MW2 are made of a metal material. The wiring VGL is formed in the wiring layer WL2. Further, the metal wiring MW2 is formed in the wiring layer WL3. Note that the metal wiring MW1 described with reference to FIG. 5 is a conductor pattern for controlling resistance of the common electrode CE and is not connected to the pixel electrode PE. Therefore, the metal wiring MW1 is not disposed between the pixel electrode PE and the insulating film 14.

First Modification

Figure 9:
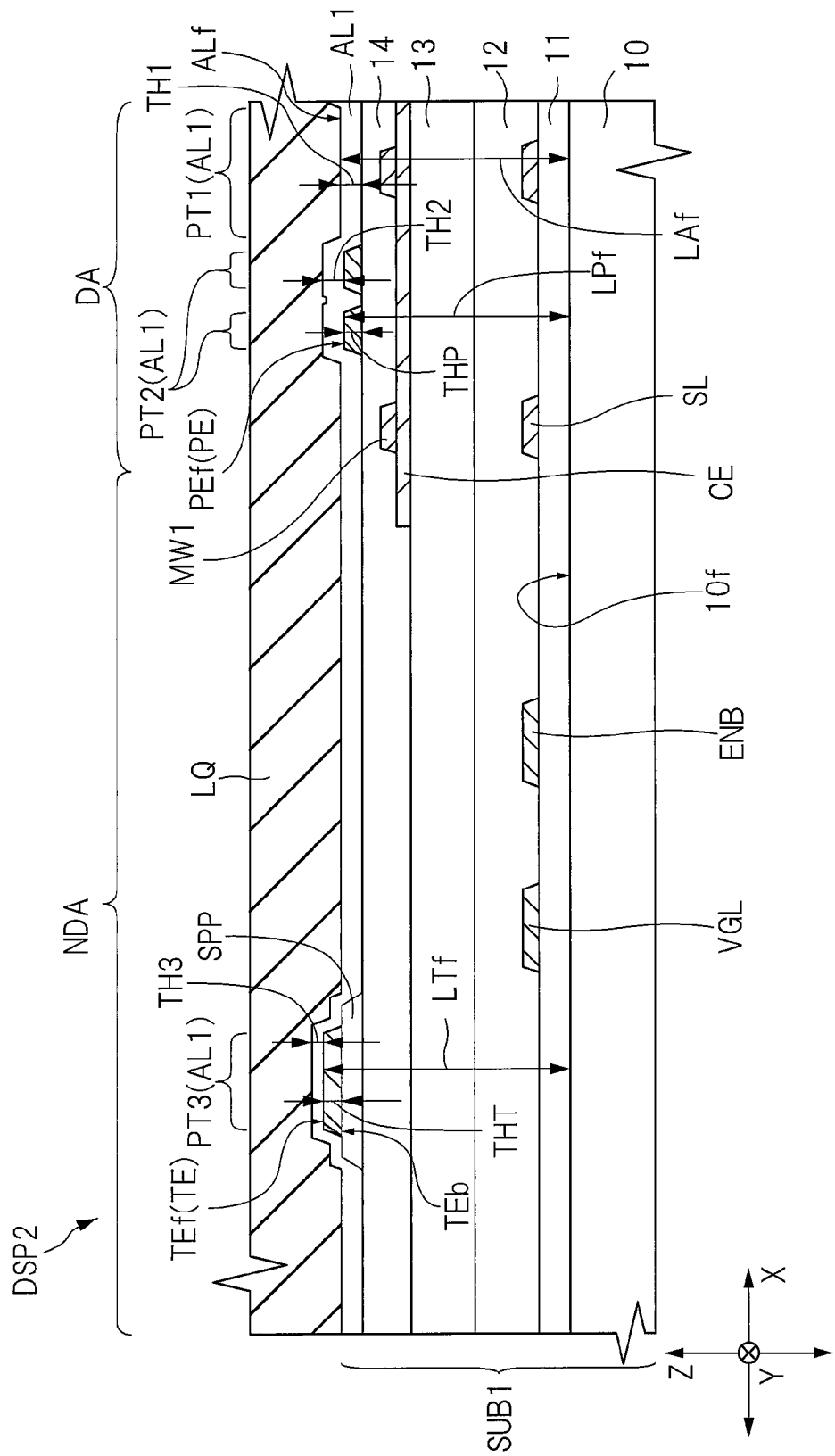
FIG. 9 is an enlarged cross-sectional view of a display device according to a modification to FIG. 7.
Figure 10:
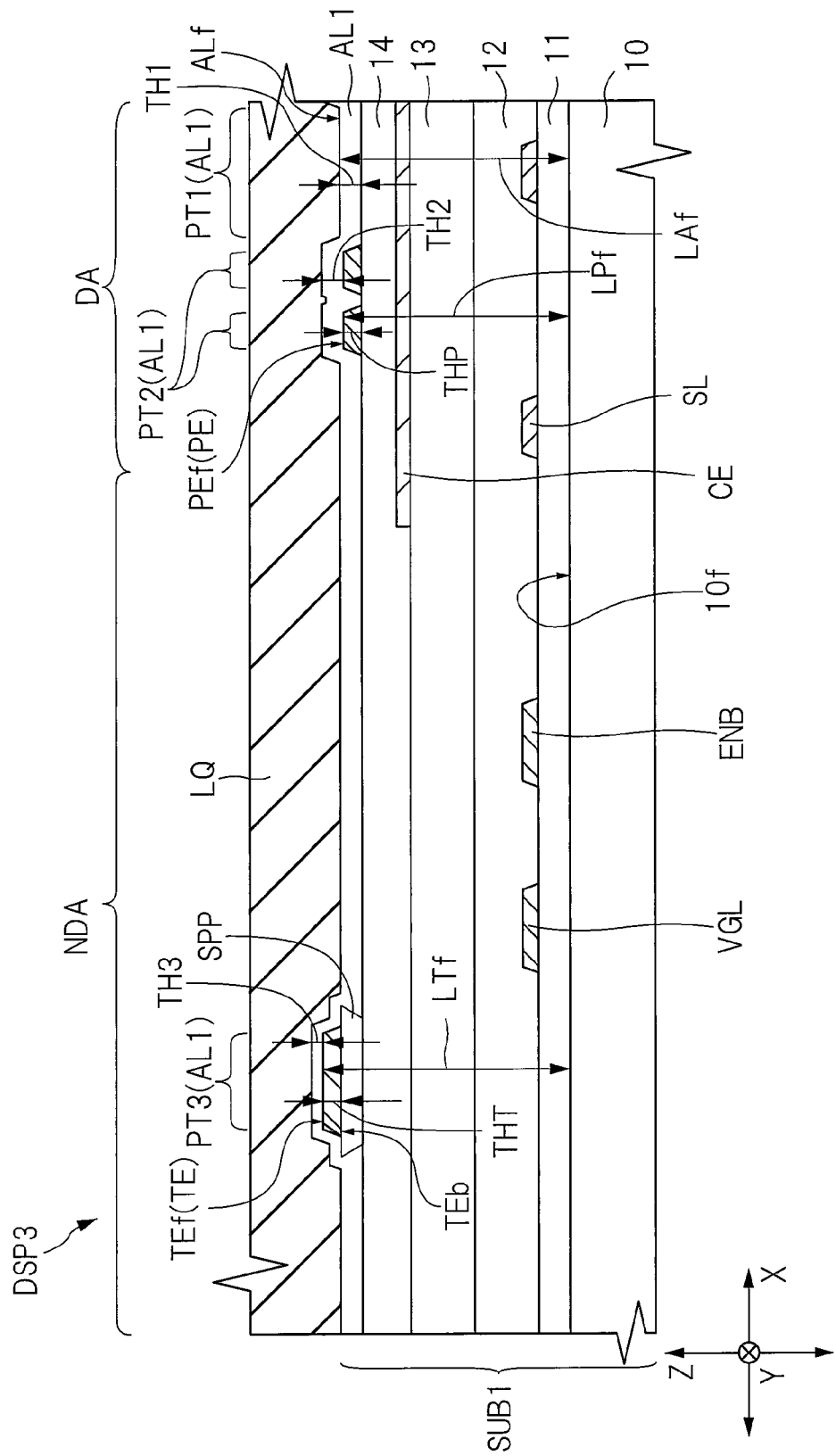
FIG. 10 is an enlarged cross-sectional view of a display device according to a modification to FIG. 9.
Figure 11:
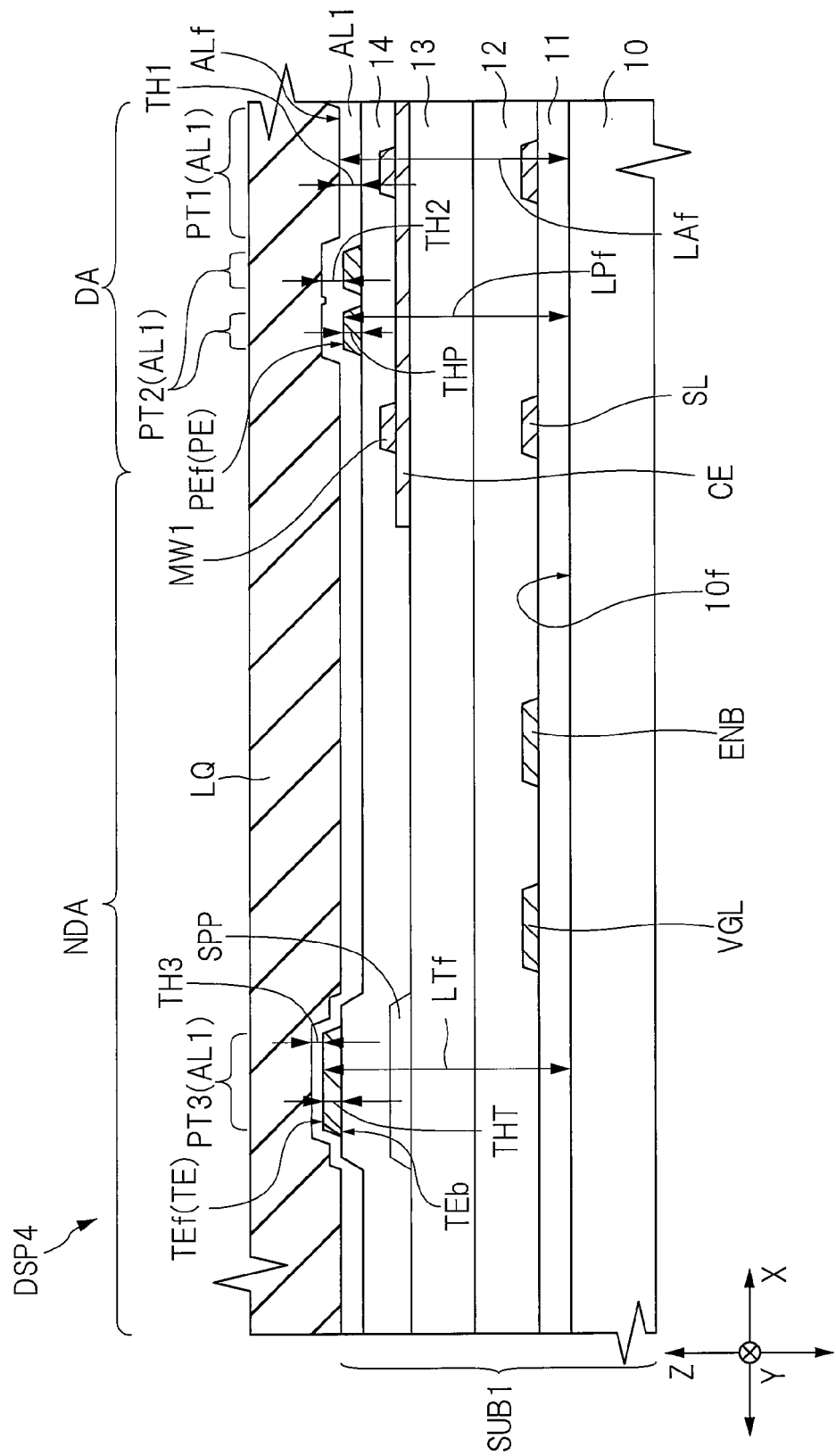
FIG. 11 is an enlarged cross-sectional view of a display device according to another modification to FIG. 9.

Next, some of various modifications to the display device DSP1 described above will be described in order. FIG. 9 is an enlarged cross-sectional view of a display device according to a modification to FIG. 7. Also, FIG. 10 is an enlarged cross-sectional view of a display device according to a modification to FIG. 9. Also, FIG. 11 is an enlarged cross-sectional view of a display device according to another modification to FIG. 9.

In the display device DSP1, as illustrated in FIG. 7, since the thickness THT of the electrode TE is formed to be greater than the thickness THP of the pixel electrode PE, description has been given regarding the implementation mode in which the thickness of the alignment film AL1 is controlled.

A display device DSP2 illustrated in FIG. 9 and a display device DSP3 illustrated in FIG. 10 are different from the display device DSP1 illustrated in FIG. 7 in that the electrode TE is formed on the insulating film 14 interposing a spacer member SPP. Further, the display device DSP2 is different from the display device DSP1 illustrated in FIG. 7 in that the thickness THT of the electrode TE of the display device DSP2 is equal to or less than the thickness THP of the pixel electrode PE.

In the case of the display device DSP2, since the spacer member SPP is disposed between the electrode TE and the insulating film 14, the height of the front surface TEf of the electrode TE is greater than the height of the front surface PEf of the pixel electrode PE. More specifically, the distance LTf from the surface 10f of the substrate 10, which is an insulating substrate, to the front surface TEf of the electrode TE is longer than the distance LPf from the surface 10f of the substrate 10 to the front surface PEf of the pixel electrode PE.

In this way, in a case where the height of the front surface TEf of the electrode TE is greater than the height of the front surface PEf of the pixel electrode PE, as already described, the thickness TH3 of the portion PT3 of the alignment film AL1 is smaller than the thickness TH2 of the portion PT2. As a result, it is possible to improve an effect of the ion trap as well as to prevent occurrence of the burn-in phenomenon.

As illustrated in FIG. 9, in the X direction crossing an extending direction of the electrode TE, a width of the spacer member SPP is longer than a width of the electrode TE. Further, in the X direction, the entire back surface TEb of the electrode TE is in contact with the spacer member SPP. In this case, it is easy to flatten the front surface TEf of the electrode TE.

Further, there are various modifications to a material of the spacer member SPP. For example, the material of the spacer member SPP may be an organic insulating film similar to the insulating film 14 and the like. Alternatively, the spacer member SPP may be formed of the same transparent conductive material as the pixel electrode PE. Further, the spacer member SPP may be formed of a metal film. From the viewpoint of reducing the impedance of the electrode TE, the spacer member SPP is preferably formed of the conductive material and more preferably, is formed of the metal film.

Further, in the case of the display device DSP2 illustrated in FIG. 9, the spacer member SPP is a trapezoid in a cross-sectional view in the thickness direction. More specifically, an upper base of the trapezoid is in contact with the back surface TEb of the electrode TE, and a lower base of the trapezoid is in contact with the insulating film 14. In this case, processing of the spacer member SPP and the electrode TE is easy. In contrast, in the case of the display device DSP3 illustrated in FIG. 10, the spacer member SPP has an inverted trapezoid (also referred to as an inverted taper) shape in which the lower base of the trapezoid is in contact with the back surface TEb of the electrode TE and the upper base of the trapezoid is in contact with the insulating film 14. In this case, compared to the example illustrated in FIG. 9, an area of the insulating film 14 exposed from the spacer member SPP increases in the vicinity of the electrode TE. Due to the increase of the exposed area of the insulating film 14, surface tension pulling the alignment film AL1 increases, whereby it is easy to process the thickness TH3 of the portion PT3 of the alignment film AL1 so as to be smaller. Note that a cross-sectional shape of the spacer member SPP is not limited to the trapezoid.

Further, in FIGS. 9 and 10, description has been given regarding the implementation mode in which the thickness THT of the electrode TE is equal to or less than the thickness THP of the pixel electrode PE; however, the thickness THT of the electrode TE illustrated in FIG. 9 may be greater than the thickness THP of the pixel electrode PE. In this case, the thickness TH3 of the portion PT3 of the alignment film AL1 may be further smaller than that in the example illustrated in FIG. 7, 9, or 10.

In FIG. 9, the metal wiring MW1, which is in contact with the common electrode CE, is formed at a position overlapping with the signal line SL, and the resistance of the common electrode CE is reduced by the metal wiring MW1. However, to reduce the distance LPf, there is no metal wiring MW1 between the pixel electrode PE and the insulating film 13.

Further, as in a display device DSP4 illustrated in FIG. 11, the spacer member SPP may be formed between the insulating film 14 and the insulating film 13. In this case, a material of the spacer member SPP is not particularly limited; however, the same material as the metal wiring MW1 is preferred. By forming the spacer member SPP using the same material as the metal wiring MW1, it is easy to increase the distance LTf between the electrode TE and the substrate 10. The display device DSP2 illustrated in FIG. 9, the display device DSP3 illustrated in FIG. 10, and the display device DSP4 illustrated in FIG. 11 are the same as the display device DSP1 illustrated in FIG. 1 except for the differences described above, and therefore, a duplicate description is omitted.

Second Modification

Figure 12:
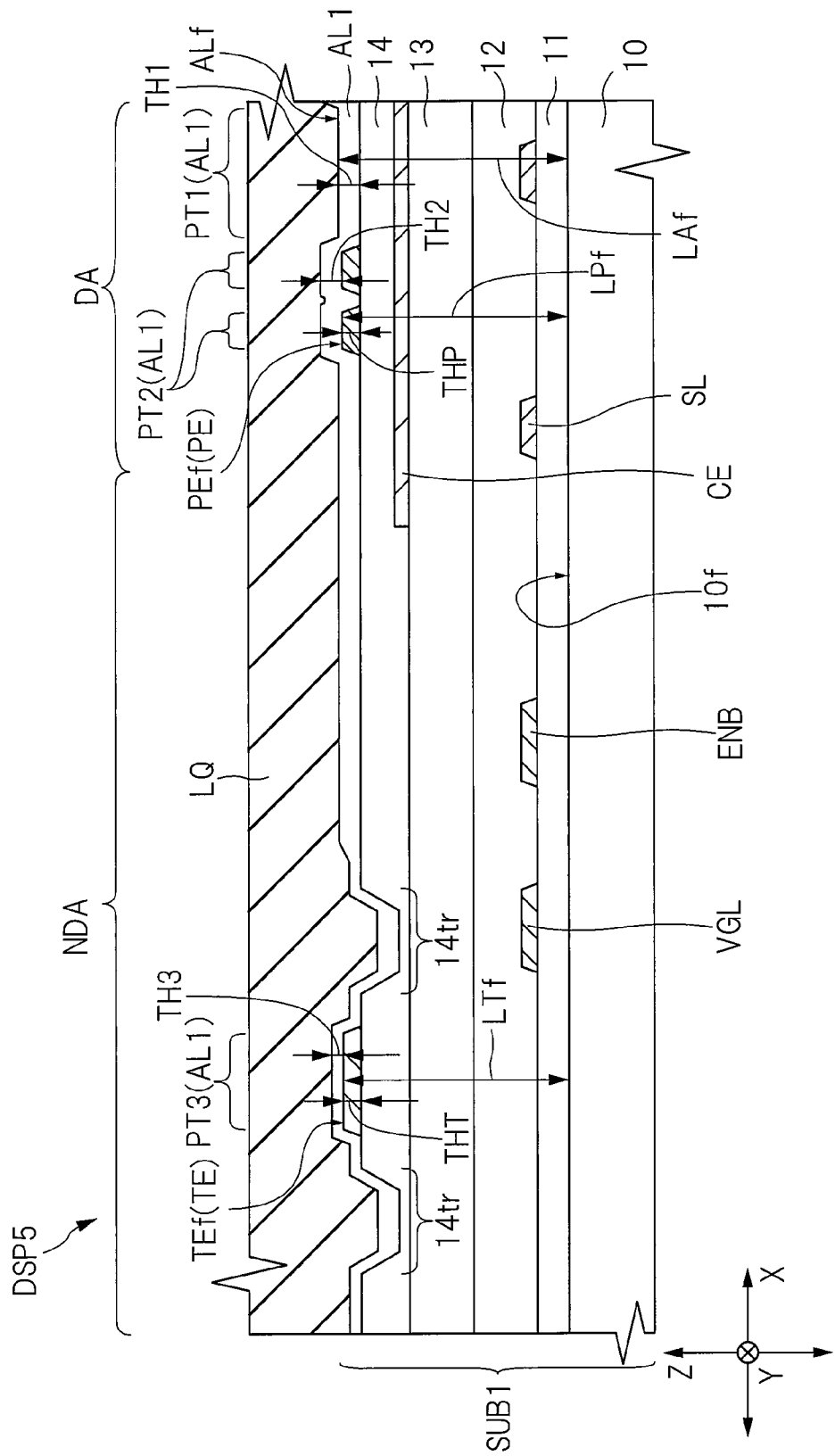
FIG. 12 is an enlarged cross-sectional view of a display device according to another modification to FIG. 7.
Figure 13:
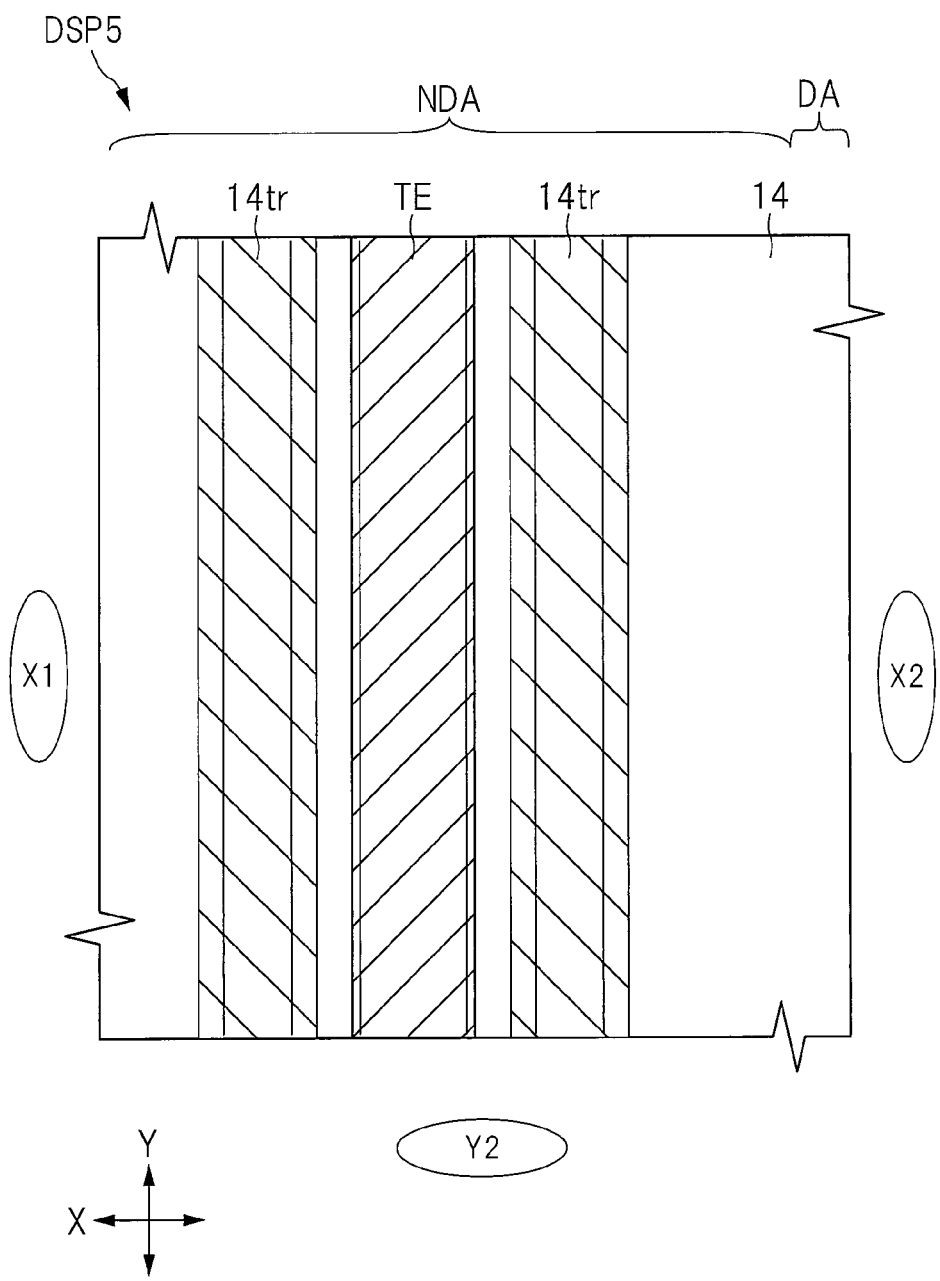
FIG. 13 is an enlarged plan view illustrating a planar positional relation between a trench portion and an electrode illustrated in FIG. 12.

In the display device DSP1 illustrated in FIG. 7 and the display device DSP2 illustrated in FIG. 9, the height of the front surface TEf of the electrode TE is higher than the height of the front surface PEf of the pixel electrode PE, whereby the implementation mode in which the thickness of the alignment film AL1 is controlled has been described. FIG. 12 is an enlarged cross-sectional view of a display device according to another modification to FIG. 7. Also, FIG. 13 is an enlarged plan view illustrating a planar positional relation between a trench portion 14tr and the electrode TE illustrated in FIG. 12. FIG. 13 is a plan view, and different kinds of hatching are added to the inside of the trench portion 14tr and the electrode TE.

A display device DSP5 illustrated in FIG. 12 is different from the display devices DSP1 and DSP2 in that the trench portion 14tr is formed in the vicinity of the electrode TE in the peripheral region NDA. Further, the display device DSP5 is different from the display device DSP1 illustrated in FIG. 7 in that the thickness THT of the electrode TE is equal to or less than the thickness THP of the pixel electrode PE. Further, the display device DSP5 is different from the display devices DSP1 and DSP2 in that the height of the front surface TEf of the electrode TE is equal to the height of the front surface PEf of the pixel electrode PE. More specifically, the distance LTf from the surface 10f of the substrate 10 of the display device DSP5 to the front surface TEf of the electrode TE is equal to the distance LPf from the surface 10f of the substrate 10 to the front surface PEf of the pixel electrode PE.

As illustrated in FIG. 12, the trench portion 14tr is formed in the peripheral region NDA of the display device DSP5. The trench portion 14tr is a recess provided at a portion of the insulating film 14. As illustrated in FIG. 13, the trench portion 14tr extends along the Y direction, which is the extending direction of the electrode TE. The trench portion 14tr is not formed in a region overlapping with the electrode TE (first region). Further, a thickness of the insulating film 14 is small in a region overlapping with the trench portion 14tr compared to a region where the trench portion 14tr is not provided (e.g., the first region). In other words, the insulating film 14 includes the first region overlapping with the electrode TE in the peripheral region NDA and a second region not overlapping with the electrode TE (region where the trench portion 14tr is provided) in the peripheral region NDA. The thickness of the insulating film 14 in the first region is greater than the thickness of the insulating film 14 in the second region.

In the case of the display device DSP5, the height of the front surface TEf of the electrode TE is equal to the height of the front surface PEf of the pixel electrode PE, and the trench portion 14tr is provided in the vicinity of the electrode TE. As described above, the mixture of the raw resin and the solvent used at the time of forming the alignment film AL1 is the low viscosity liquid. Therefore, when there is unevenness on the surface to be coated, the thickness of the coating film covering the surface to be coated having a projected shape is formed to be smaller than the thickness of the coating film covering the surface to be coated having a recessed shape. In the case of the display device DSP5, by providing the trench portion 14tr in the vicinity of the electrode TE, most of the liquid that has been applied flows into the trench portion 14tr. That is, the trench portion 14tr has a function as a liquid absorbing portion that collects liquid including the raw material of the alignment film AL1 from above the electrode TE. As a result, in the region overlapping with the electrode TE, the thickness TH3 of the portion PT3 of the alignment film AL1 becomes small. Meanwhile, in the display region DA, the trench portion 14tr is not formed. Therefore, of the alignment film AL1, the thickness TH2 of the portion PT2 overlapping with the pixel electrode PE becomes relatively great compared to the thickness TH3 of the portion PT3.

Therefore, according to the display device DSP5, it is possible to improve the efficiency of the ion trap as well as to prevent occurrence of the burn-in phenomenon.

In the example illustrated in FIG. 13, in a plan view, two trench portions 14tr are disposed interposing the electrode TE. In other words, in the X direction, the trench portions 14tr are disposed on both sides of the electrode TE. From a viewpoint of reducing the thickness TH3 illustrated in FIG. 12, it is particularly preferred that the trench portions 14tr are formed on both sides of the electrode TE as illustrated in FIG. 13. However, even in a case where only one of two trench portions 14*tr* illustrated in FIG. 13 is formed, compared to a case where no trench portion 14*tr* is formed, it is possible to obtain an effect of reducing the thickness TH3 illustrated in FIG. 12. Since the thickness of the alignment film AL1 tends to be greater at a position closer to the display region DA, it is preferred that the trench portion 14*tr* is preferentially disposed between the display region DA and the electrode TE.

Further, of the alignment film AL1, in order to reduce the thickness TH3 of the portion PT3 overlapping with the electrode TE, it is preferred that a distance between the electrode TE and the trench portion 14*tr* is short. In the case of the display device DSP5, the trench portion 14*tr* is positioned closer to the electrode TE than the pixel electrode PE as illustrated in FIG. 12.

Further, the thickness TH3 of the portion PT3 of the alignment film AL1 can be adjusted by a trench width and a trench depth of the trench portion 14*tr*. In the example illustrated in FIG. 12, the trench portion 14*tr* is formed in the insulating film 14, which is an organic insulating film. To further deepen the trench depth, however, the trench portion 14*tr* may be formed so as to penetrate a plurality of insulating films among the insulating films 11, 12, 13, and 14. In the example illustrated in FIG. 12, the insulating film 11 is an inorganic insulating film, and the insulating films 12, 13, and 14 are organic insulating films. Since the organic insulating films are greater than the inorganic insulating film as illustrated in FIG. 12, a margin for controlling the thickness TH3 of the portion PT3 of the alignment film AL1 is larger by reducing the thickness of the organic insulating films.

Further, in FIG. 12, description has been given regarding the implementation mode in which the thickness of the insulating film 14 is small in the region overlapping with the trench portion 14*tr* (e.g., the second region); however, it is also possible that thickness of the insulating film 12 or the insulating film 13 is small. In this case, it is possible to form the trench portion 14*tr* even when the thickness of the insulating film 14 is fixed.

Further, as another modification to the display device DSP5 illustrated in FIG. 12, it is also possible that the thickness of the insulating film 11 is small in the region overlapping with the trench portion 14*tr*. In such case, moisture contained in the alignment film AL1 is easily discharged to the outside through the organic insulating films.

Further, in FIGS. 12 and 13, description has been given regarding the implementation mode in which the liquid including the raw material of the alignment film AL1 flows in the trench portion 14*tr*, so that the thickness TH3 of the alignment film AL1 in the portion PT3 overlapping with the electrode TE can be reduced. However, as long as a state is achieved in which the raw material liquid of the alignment film AL1 easily flows from the portion PT3 overlapping with the electrode TE to the periphery, the trench portion 14*tr* may not be formed. For example, in place of the trench portions 14*tr* illustrated in FIG. 13, it is also possible to provide a portion (liquid absorbing portion) made of a material having higher affinity for the alignment film AL1 than that for the material constituting the electrode TE.

Further, in FIGS. 12 and 13, description has been given regarding the implementation mode in which the thickness THT of the electrode TE is equal to or less than the thickness THP of the pixel electrodes PE; however, the thickness THT of the electrode TE illustrated in FIG. 12 may also be greater than the thickness THP of the pixel electrode PE. In this case, the thickness TH3 of the portion PT3 of the alignment film AL1 becomes further smaller than that in the example illustrated in FIG. 7, 9, 10, or 11.

The display device DSP5 illustrated in FIGS. 12 and 13 is the same as the display device DSP1 illustrated in FIG. 1 except for the differences described above, and therefore, a duplicate description is omitted.

Third Modification

Figure 14:
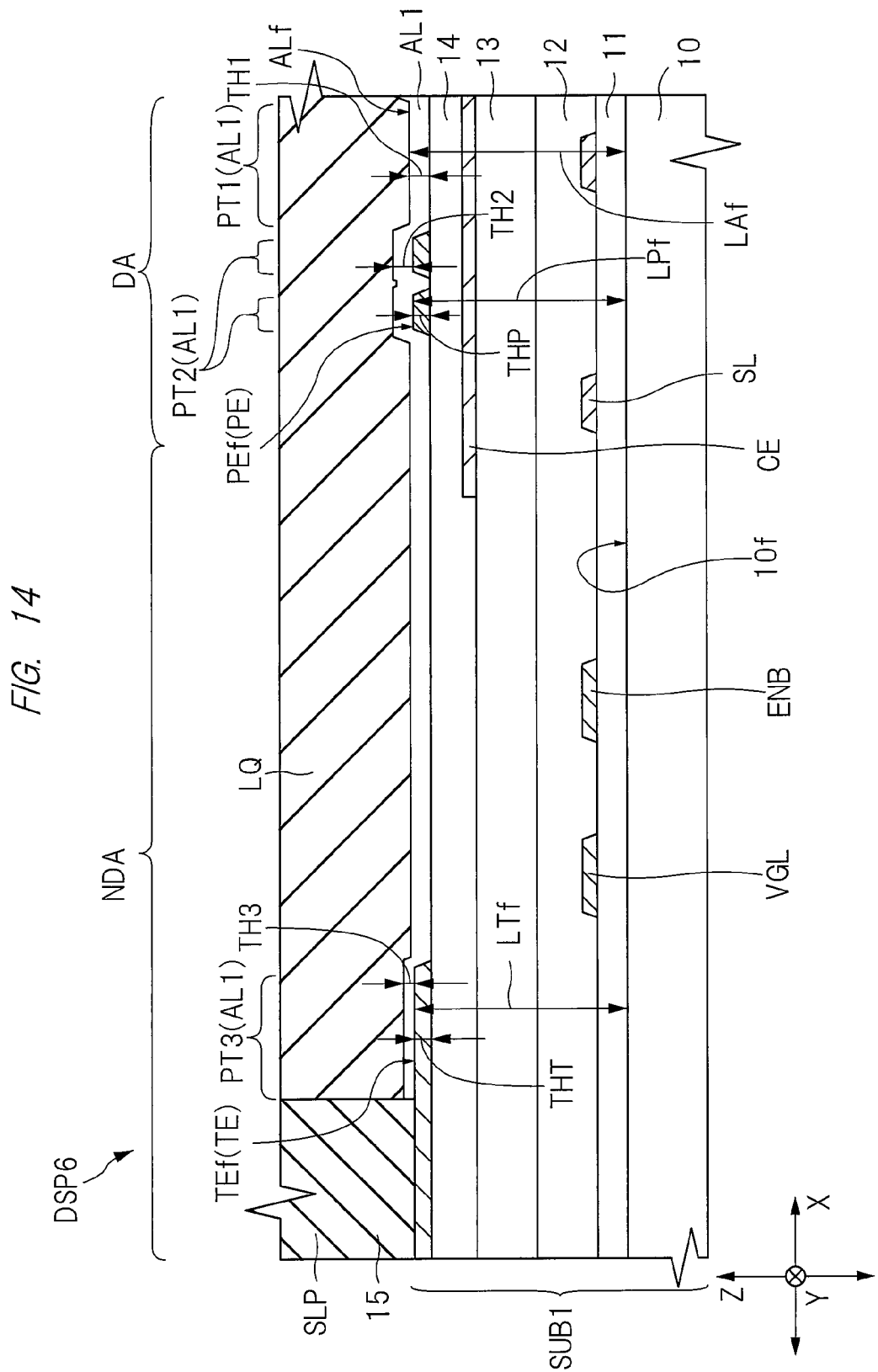
FIG. 14 is an enlarged cross-sectional view illustrating a modification to FIG. 4.

Further, as illustrated in FIG. 4, description has been given regarding the implementation mode in which the electrode TE is provided between the sealing portion SLP and the display region DA in the display device DSP1. However, as illustrated in FIG. 14, it is also possible that a portion of the electrode TE is positioned between the sealing portion SLP and the insulating film 14. FIG. 14 is an enlarged cross-sectional view illustrating a modification to FIG. 4.

A display device DSP6 illustrated in FIG. 14 is different from the display device DSP1 illustrated in FIG. 4 in that the portion of the electrode TE is extended to a region between the sealing portion SLP and the insulating film 14. In the display device DSP6, a width of the peripheral region NDA in the X direction is smaller than a width thereof of the display device DSP1 illustrated in FIG. 4.

In the case of the display device DSP6, the alignment film AL1 is in contact with a portion of the front surface TEf of the electrode TE and is not in contact with any other portion. Therefore, the portion PT3 of the alignment film AL1 described with reference to FIG. 7 and the like may be defined as a portion in contact with the front surface TEf of the electrode TE, of the alignment film AL1.

The display device DSP6 illustrated in FIG. 14 is the same as the display device DSP1 illustrated in FIG. 1 except for the differences described above, and therefore, a duplicate description is omitted. Further, although FIG. 14 has been representatively described as the modification to FIG. 7, it is also applicable in combination with the modifications described with reference to FIGS. 9 to 12.

Various modifications and alterations can be conceived by those skilled in the art within the spirit of the present invention, and it is understood that such modifications and alterations are also encompassed within the scope of the present invention. For example, those skilled in the art can suitably modify the above-described embodiment by addition, deletion, or design change of components, or by addition, omission, or condition change of steps. Such modifications are also encompassed within the scope of the present invention as long as they include the gist of the present invention.

The present invention is applicable to a display device and an electronic device in which the display device is incorporated.

What is claimed is:
1. A display device comprising:
an insulating substrate having a display region and a peripheral region outside the display region;
a light shielding film overlapping with e peripheral region;
a liquid crystal layer;
an insulating film between the liquid crystal layer and the insulating substrate;
an alignment film between the insulating film and the liquid crystal layer and having a front surface in contact with the liquid crystal layer;

a first display electrode between the insulating film and the alignment film in the display region and having a front surface in contact with the alignment film; and
a first electrode between the insulating film and the alignment film in the peripheral region and having a front surface in contact with the alignment film,
wherein the first electrode is supplied with an electric potential in the peripheral region,
wherein each of the alignment film, the first display electrode, and the first electrode is formed on the insulating film,
wherein a vertical distance from an upper surface of the insulating substrate to the front surface of the first electrode is longer than a vertical distance from the upper surface of the insulating substrate to the front surface of the first display electrode,
wherein the insulating film includes a first region overlapping with the first electrode in the peripheral region, and a second region not overlapping with the first electrode in the peripheral region,
wherein a thickness of the insulating film in the first region is greater than a thickness of the insulating film in the second region,
wherein the insulating film includes an inorganic insulating film and an organic insulating film, and
wherein, of the organic insulating film, a thickness of the organic insulating film in the first region is greater than a thickness of the organic insulating film in the second region.

2. The display device according to claim 1,
wherein a thickness of the alignment film in a region overlapping with the first electrode is smaller than a thickness of the alignment film in a region overlapping with the first display electrode.

3. The display device according to claim 1,
wherein the alignment film includes a first portion not overlapping with the first display electrode in the display region, and a second portion overlapping with the first display electrode in the display region, and
wherein a distance from the insulating substrate to a front surface of the first portion of the alignment film is shorter than the distance from the insulating substrate to the front surface of the first electrode and is longer than the distance from the insulating substrate to the front surface of the first display electrode.

4. The display device according to claim 1,
wherein the alignment film includes a first portion not overlapping with the first display electrode in the display region, and a second portion overlapping with the first display electrode in the display region, and
wherein a thickness of the first electrode is greater than a thickness of the first portion of the alignment film.

5. The display device according to claim 1,
wherein the alignment film includes a first portion not overlapping with the first display electrode in the display region, and a second portion overlapping with the first display electrode in the display region, and
wherein a thickness of the second portion of the alignment film is 70% or more and 130% or less of a thickness of the first display electrode.

6. The display device according to claim 1,
wherein the alignment film includes a first portion not overlapping with the first display electrode in the display region, and a second portion overlapping with the first display electrode in the display region, and
wherein a thickness of the second portion of the alignment film is greater than a thickness of the first display electrode.

7. The display device according to claim 1, further comprising:
a second display electrode between the first display electrode and the insulating substrate; and
a first metal wiring in contact with the second display electrode,
wherein the insulating film has an interlayer insulating film between the first display electrode and the second display electrode,
wherein the first metal wiring is not disposed between the first display electrode and the insulating substrate, and
wherein a metal film being in the same layer as the first metal wiring is disposed between the first electrode and the insulating substrate.

8. A display device comprising:
an insulating substrate having a display region and a peripheral region outside the display region;
a light shielding film overlapping with the peripheral region;
a liquid crystal layer;
an insulating film between the liquid crystal layer and the insulating substrate;
an alignment film between the insulating film and the liquid crystal layer and having a front surface in contact with the liquid crystal layer;
a first display electrode between the insulating film and the alignment film in the display region and having a front surface in contact with the alignment film;
a first electrode between the insulating film and the alignment film in the peripheral region and having a front surface in contact with the alignment film;
a second display electrode between the first display electrode and the insulating substrate; and
a first metal wiring in contact with the second display electrode,
wherein the first electrode is supplied with an electric potential in the peripheral region,
wherein each of the alignment film, the first display electrode, and the first electrode is formed on the insulating film,
wherein a vertical distance from an upper surface of the insulating substrate to the front surface of the first electrode is longer than a vertical distance from the upper surface of the insulating substrate to the front surface of the first display electrode,
wherein the insulating film has an interlayer insulating film between the first display electrode and the second display electrode,
wherein the first metal wiring is not disposed between the first display electrode and the insulating substrate, and
wherein a metal film being in the same layer as the first metal wiring is disposed between the first electrode and the insulating substrate.

9. The display device according to claim 8,
wherein a thickness of the alignment film in a region overlapping with the first electrode is smaller than a thickness of the alignment film in a region overlapping with the first display electrode.

10. The display device according to claim 8,
wherein the alignment film includes a first portion not overlapping with the first display electrode in the display region, and a second portion overlapping with the first display electrode in the display region, and wherein a distance from the insulating substrate to a front surface of the first portion of the alignment film is shorter than the distance from the insulating substrate to the front surface of the first electrode and is longer than the distance from the insulating substrate to the front surface of the first display electrode.

11. The display device according to claim 8, wherein the alignment film includes a first portion not overlapping with the first display electrode in the display region, and a second portion overlapping with the first display electrode in the display region, and wherein a thickness of the first electrode is greater than a thickness of the first portion of the alignment film.

12. The display device according to claim 8, wherein the alignment film includes a first portion not overlapping with the first display electrode in the display region, and a second portion overlapping with the first display electrode in the display region, and wherein a thickness of the second portion of the alignment film is 70% or more and 130% or less of a thickness of the first display electrode.

13. The display device according to claim 8, wherein the alignment film includes a first portion not overlapping with the first display electrode in the display region, and a second portion overlapping with the first display electrode in the display region, and wherein a thickness of the second portion of the alignment film is greater than a thickness of the first display electrode.

14. The display device according to claim 8, wherein the insulating film includes a first region overlapping with the first electrode in the peripheral region, and a second region not overlapping with the first electrode in the peripheral region, and wherein a thickness of the insulating film in the first region is greater than a thickness of the insulating film in the second region.

* * * * *